(12) United States Patent
Poscher et al.

(10) Patent No.: US 12,648,046 B2
(45) Date of Patent: Jun. 2, 2026

(54) VIRTUAL RADIO CHANNEL BASED WIRELESS CONNECTIVITY

(71) Applicant: Telefonaktiebolaget LM Ericsson (publ), Stockholm (SE)

(72) Inventors: Jens Poscher, Aachen (DE); Stefan Eichinger, Pulheim (DE); Ralph Detke, Herzogenrath (DE); Pedro Tercero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 296 days.

(21) Appl. No.: 18/281,626

(22) PCT Filed: Mar. 24, 2021

(86) PCT No.: PCT/EP2021/057623
§ 371 (c)(1),
(2) Date: Sep. 12, 2023

(87) PCT Pub. No.: WO2022/199816
PCT Pub. Date: Sep. 29, 2022

(65) Prior Publication Data
US 2024/0155724 A1     May 9, 2024

(51) Int. Cl.
*H04W 76/25* (2018.01)
*H04W 28/02* (2009.01)

(52) U.S. Cl.
CPC ....... *H04W 76/25* (2018.02); *H04W 28/0252* (2013.01)

(58) Field of Classification Search
None
See application file for complete search history.

(56) References Cited

U.S. PATENT DOCUMENTS 11,552,953 B1 * 1/2023 Avadhanam .......... H04L 63/102
2009/0111456 A1 4/2009 Shaffer et al.
(Continued)

FOREIGN PATENT DOCUMENTS

EP     0995279 A1     4/2000
EP     1717967 A2     11/2006
(Continued)

OTHER PUBLICATIONS

International Search Report and Written Opinion of the International Searching Authority, PCT/EP2021/057623, mailed Jan. 4, 2022, 14 pages.

*Primary Examiner* — Lonnie V Sweet
(74) *Attorney, Agent, or Firm* — Sage Patent Group

(57) ABSTRACT

A radio access network, RAN, node of a wireless communication network maintains a radio channel having a network-side termination at the RAN node and a subscriber-side termination at a wireless access device. Further, the RAN node maintains one or more further radio channels. The one or more further radio channels each have a network-side termination at the RAN node and a respective subscriber-side termination at a respective further wireless access device. The RAN node associates the radio channel and the one or more further radio channels to a virtual radio channel for carrying data between the RAN node and the wireless access device. The one or more further wireless access devices are assigned for forwarding data between the wireless access device and the respective further radio channel having its subscriber-side termination at the further wireless access device.

21 Claims, 12 Drawing Sheets

(56)                    References Cited

U.S. PATENT DOCUMENTS

| | | | |
|---|---|---|---|
| 2013/0148607 A1* | 6/2013 | Yu | H04W 72/51 |
| | | | 370/329 |
| 2015/0163822 A1* | 6/2015 | Guo | H04W 72/12 |
| | | | 370/329 |
| 2015/0181479 A1* | 6/2015 | Lin | H04W 24/04 |
| | | | 370/329 |
| 2016/0044002 A1* | 2/2016 | Ying | H04L 63/0428 |
| | | | 713/168 |
| 2017/0223568 A1* | 8/2017 | Xu | H04W 76/11 |
| 2017/0353883 A1* | 12/2017 | Tenny | H04W 28/06 |
| 2018/0063014 A1* | 3/2018 | Yu | H04W 28/12 |
| 2018/0206282 A1* | 7/2018 | Singh | H04W 76/15 |
| 2019/0059019 A1* | 2/2019 | Wallentin | H04W 28/0278 |
| 2019/0253836 A1* | 8/2019 | Sinha | H04W 8/04 |
| 2020/0305220 A1* | 9/2020 | Iwai | H04W 72/1263 |
| 2021/0045093 A1* | 2/2021 | Rao | H04W 76/14 |
| 2021/0227628 A1* | 7/2021 | Sevindik | H04W 88/10 |
| 2021/0274426 A1* | 9/2021 | Grayson | H04M 15/60 |
| 2021/0298070 A1* | 9/2021 | Zhang | H04W 74/04 |
| 2021/0352522 A1* | 11/2021 | Hwang | H04W 28/0278 |
| 2022/0046463 A1* | 2/2022 | Wu | H04W 28/0278 |
| 2023/0109389 A1* | 4/2023 | Li | H04W 12/033 |
| | | | 455/410 |
| 2023/0156688 A1* | 5/2023 | Kuang | H04W 72/1263 |
| | | | 370/329 |
| 2023/0180189 A1* | 6/2023 | Bontu | H04W 72/02 |
| | | | 370/329 |

FOREIGN PATENT DOCUMENTS

| | | | |
|---|---|---|---|
| EP | 2080309 A1 | 7/2009 |
| EP | 3432655 A1 | 1/2019 |

* cited by examiner

810 — Maintain radio channel

820 — Maintain further radio channel(s)

830 — Associate radio channel and further radio channel(s) to virtual radio channel 840 — Distribute data to radio channel and further radio channel(s)

910 — Module 1:
Maintaining radio channel

920 — Module 2:
Maintaining further radio channel(s)

930 — Module 3:
Associating radio channel and
further radio channel(s) to
virtual radio channel 940 — Module 4:
Distributing data to radio channel and
further radio channel(s)

900

RAN node

1010 — Maintain radio channel

1020 — Maintain connection to further wireless access device(s)

1030 — Associate radio channel and further radio channel(s) to virtual radio channel 1040 — Distribute data to radio channel and further radio channel(s)

1210 — Maintain radio channel

1220 — Maintain connection to further wireless access device

1230 — Associate radio channel and further radio channel to virtual radio channel 1240 — Forward data between radio channel and further wireless access device 1310 — Module 1:
Maintaining radio channel 1320 — Module 2:
Maintaining connection to
further wireless access device 1330 — Module 3:
Associating radio channel and
further radio channel(s) to
virtual radio channel 1340 — Module 4:
Forwarding data between radio channel
and further wireless access device

1300

Wireless access device

VIRTUAL RADIO CHANNEL BASED WIRELESS CONNECTIVITY

CROSS REFERENCE TO RELATED APPLICATIONS

This application is a 35 U.S.C. § 371 national stage application of PCT International Application No. PCT/EP2021/057623 filed on Mar. 24, 2021, the disclosure and content of which is incorporated by reference herein in its entirety.

TECHNICAL FIELD

The present invention relates to methods for providing wireless connectivity and to corresponding devices, systems, and computer programs.

BACKGROUND

In wireless communication networks as for example specified by 3GPP ($3^{rd}$ Generation Partnership Project), e.g., based on the LTE (Long Term Evolution) or NR (New Radio) technology, it is also known to utilize a UE (user equipment) as a wireless access device or CPE (Customer Premises Equipment) to provide network connectivity to other devices. For example, it is utilize a Fixed Wireless Access (FWA) CPE device to provide internet connectivity of a household or business premises.

In such cases, the FWA CPE device is often placed without particularly optimizing the position of the FWA CPE device for best connectivity, radio conditions, or performance. Further, it may occur that obstacles like trees or buildings adversely affect the radio channel conditions, e.g., due to shielding effects or reflections. As a result, the performance of a FWA CPE may strongly depend on characteristics of the utilized radio channel.

Further, wireless access devices may also be used for providing data connectivity in a vehicle, e.g., in an automated guided vehicle (AGV). Also in this case, performance may strongly depend on the utilized radio channel, and such variations typically also depend on movement of the vehicle. As a result, there may be a risk of a loss of connectivity due to irregular indoor or outdoor wireless coverage, which may in turn cause the AGV to stop, slowing down manufacturing processes and causing economic impact.

Accordingly, there is a need for techniques which allow for efficiently providing wireless connectivity to a wireless access device.

SUMMARY

According to an embodiment, a method of providing wireless connectivity network is provided. According to the method, a radio access network (RAN) node of a wireless communication network maintains a radio channel having a network-side termination at the RAN node and a subscriber-side termination at a wireless access device. Further, the RAN node maintains one or more further radio channels. The one or more further radio channels each have a network-side termination at the RAN node and a respective subscriber-side termination at a respective further wireless access device. The RAN node associates the radio channel and the one or more further radio channels to a virtual radio channel for carrying data between the RAN node and the wireless access device. The one or more further wireless access devices are assigned for forwarding data between the wireless access device and the respective further radio channel having its subscriber-side termination at the further wireless access device.

According to a further embodiment, a method of providing wireless connectivity network is provided. According to the method, a wireless access device maintains a radio channel having a subscriber-side termination at the wireless access device and a network-side termination at a RAN node of a wireless communication network. Further, the wireless access device maintains a connection to one or more further wireless access devices. The one or more further wireless access devices each maintain a respective further radio channel having a subscriber-side termination at the further wireless access device and a network-side termination at the RAN node. The wireless access device associates the radio channel and the one or more further radio channels to a virtual radio channel for carrying data between wireless access device and the RAN node. The one or more further wireless access devices are assigned for forwarding at least a part of the data between the wireless access device and the respective further radio channel having its subscriber-side termination at the further wireless access device.

According to a further embodiment, a method of providing wireless connectivity network is provided. According to the method, a wireless access device maintains a radio channel having a subscriber-side termination at the wireless access device and a network-side termination at a RAN node. Further, the wireless access device maintains a connection to a further wireless access device, which maintains a further radio channel having a subscriber-side termination at the further wireless access device and a network-side termination at the RAN node. The wireless access device associates the radio channel and the further radio channel to a virtual radio channel for carrying data between further wireless access device and the RAN node. Further, the wireless access device forwards at least a part of the data between the radio channel and the further wireless access device.

According to a further embodiment, a RAN node is provided. The RAN node is configured to maintain a radio channel having a network-side termination at the RAN node and a subscriber-side termination at a wireless access device. Further, the RAN node is configured to maintain one or more further radio channels. The further radio channels each have a network-side termination at the RAN node and a respective subscriber-side termination at a respective further wireless access device. Further, the RAN node is configured to associate the radio channel and the one or more further radio channels to a virtual radio channel for carrying data between the RAN node and the wireless access device. The one or more further wireless access devices are assigned for forwarding data between the wireless access device and the respective further radio channel having its subscriber-side termination at the further wireless access device.

According to a further embodiment, a RAN node is provided. The RAN node comprises at least one processor and a memory. The memory contains instructions executable by said at least one processor, whereby the RAN node is operative to maintain a radio channel having a network-side termination at the RAN node and a subscriber-side termination at a wireless access device. Further, the memory contains instructions executable by said at least one processor, whereby the RAN node is operative to maintain one or more further radio channels. The further radio channels each have a network-side termination at the RAN node and a respective subscriber-side termination at a respective further wireless access device. Further, the memory contains instructions executable by said at least one processor, whereby the RAN node is operative to associate the radio channel and the one or more further radio channels to a virtual radio channel for carrying data between the RAN node and the wireless access device. The one or more further wireless access devices are assigned for forwarding data between the wireless access device and the respective further radio channel having its subscriber-side termination at the further wireless access device.

According to a further embodiment, a wireless access device is provided. The wireless access device is configured to maintain a radio channel having a subscriber-side termination at the wireless access device and a network-side termination at a RAN node of a wireless communication network. Further, the wireless access device is configured to maintain a connection to one or more further wireless access devices. The one or more further wireless access devices each maintain a respective further radio channel having a subscriber-side termination at the further wireless access device and a network-side termination at the RAN node. Further, the wireless access device is configured to associate the radio channel and the one or more further radio channels to a virtual radio channel for carrying data between wireless access device and the RAN node. The one or more further wireless access devices are assigned for forwarding at least a part of the data between the wireless access device and the respective further radio channel having its subscriber-side termination at the further wireless access device.

According to a further embodiment, a wireless access device is provided. The wireless access device comprises at least one processor and a memory. The memory contains instructions executable by said at least one processor, whereby the wireless access device is operative to maintain a radio channel having a subscriber-side termination at the wireless access device and a network-side termination at a RAN node of a wireless communication network. Further, the memory contains instructions executable by said at least one processor, whereby the wireless access device is operative to maintain a connection to one or more further wireless access devices. The one or more further wireless access devices each maintain a respective further radio channel having a subscriber-side termination at the further wireless access device and a network-side termination at the RAN node. Further, the memory contains instructions executable by said at least one processor, whereby the wireless access device is operative to associate the radio channel and the one or more further radio channels to a virtual radio channel for carrying data between wireless access device and the RAN node. The one or more further wireless access devices are assigned for forwarding at least a part of the data between the wireless access device and the respective further radio channel having its subscriber-side termination at the further wireless access device.

According to a further embodiment, a wireless access device is provided. The wireless access device is configured to maintain a radio channel having a subscriber-side termination at the wireless access device and a network-side termination at a RAN node. Further, the wireless access device is configured to maintain a connection to a further wireless access device, which maintains a further radio channel having a subscriber-side termination at the further wireless access device and a network-side termination at the RAN node. Further, the wireless access device is configured to associate the radio channel and the further radio channel to a virtual radio channel for carrying data between further wireless access device and the RAN node. Further, the wireless access device is configured to forward at least a part of the data between the radio channel and the further wireless access device.

According to a further embodiment, a wireless access device is provided. The wireless access device comprises at least one processor and a memory. The memory contains instructions executable by said at least one processor, whereby the wireless access device is operative to maintain a radio channel having a subscriber-side termination at the wireless access device and a network-side termination at a RAN node. Further, the memory contains instructions executable by said at least one processor, whereby the wireless access device is operative to maintain a connection to a further wireless access device, which maintains a further radio channel having a subscriber-side termination at the further wireless access device and a network-side termination at the RAN node. Further, the memory contains instructions executable by said at least one processor, whereby the wireless access device is operative to associate the radio channel and the further radio channel to a virtual radio channel for carrying data between further wireless access device and the RAN node. Further, the memory contains instructions executable by said at least one processor, whereby the wireless access device is operative to forward at least a part of the data between the radio channel and the further wireless access device.

According to a further embodiment of the invention, a computer program or computer program product is provided, e.g., in the form of a non-transitory storage medium, which comprises program code to be executed by at least one processor of a RAN node. Execution of the program code causes the RAN node to maintain a radio channel having a network-side termination at the RAN node and a subscriber-side termination at a wireless access device. Further, execution of the program code causes the RAN node to maintain one or more further radio channels. The further radio channels each have a network-side termination at the RAN node and a respective subscriber-side termination at a respective further wireless access device. Further, execution of the program code causes the RAN node to associate the radio channel and the one or more further radio channels to a virtual radio channel for carrying data between the RAN node and the wireless access device. The one or more further wireless access devices are assigned for forwarding data between the wireless access device and the respective further radio channel having its subscriber-side termination at the further wireless access device.

According to a further embodiment of the invention, a computer program or computer program product is provided, e.g., in the form of a non-transitory storage medium, which comprises program code to be executed by at least one processor of a wireless access device. Execution of the program code causes the wireless access device to maintain a radio channel having a subscriber-side termination at the wireless access device and a network-side termination at a RAN node of a wireless communication network. Further, execution of the program code causes the wireless access device to maintain a connection to one or more further wireless access devices. The one or more further wireless access devices each maintain a respective further radio channel having a subscriber-side termination at the further wireless access device and a network-side termination at the RAN node. Further, execution of the program code causes the wireless access device to associate the radio channel and the one or more further radio channels to a virtual radio channel for carrying data between wireless access device and the RAN node. The one or more further wireless access devices are assigned for forwarding at least a part of the data between the wireless access device and the respective further radio channel having its subscriber-side termination at the further wireless access device.

According to a further embodiment of the invention, a computer program or computer program product is provided, e.g., in the form of a non-transitory storage medium, which comprises program code to be executed by at least one processor of a wireless access device. Execution of the program code causes the wireless access device to maintain a radio channel having a subscriber-side termination at the wireless access device and a network-side termination at a RAN node. Further, execution of the program code causes the wireless access device to maintain a connection to a further wireless access device, which maintains a further radio channel having a subscriber-side termination at the further wireless access device and a network-side termination at the RAN node. Further, execution of the program code causes the wireless access device to associate the radio channel and the further radio channel to a virtual radio channel for carrying data between further wireless access device and the RAN node. Further, execution of the program code causes the wireless access device to forward at least a part of the data between the radio channel and the further wireless access device.

Details of such embodiments and further embodiments will be apparent from the following detailed description of embodiments.

DETAILED DESCRIPTION

In the following, concepts in accordance with exemplary embodiments of the invention will be explained in more detail and with reference to the accompanying drawings. The illustrated embodiments relate to providing wireless connectivity to a wireless access device. The wireless access device is assumed to have the purpose of providing network connectivity to one or more further devices or systems. For example, the wireless access device could correspond to a FWA-CPE device or to a vehicle based gateway. In the following, such different types of wireless access device will also be denoted as CPE device. The wireless communication network could for example be based on the LTE technology and/or the NR technology.

In the illustrated concepts multiple wireless access devices may cooperate by associating multiple radio channels to a virtual radio channel. In particular, each of the wireless access devices maintains a corresponding radio channel to a RAN node of the wireless communication network. The radio channel may for example correspond to a Data Radio Bearer (DRB). The virtual radio channel aggregates the multiple radio channels, thereby allowing to achieve enhanced performance and/or enhanced robustness. Further, available radio resources may be utilized in an efficient manner by using load balancing to distribute data to the multiple radio channels.

Figure 1:
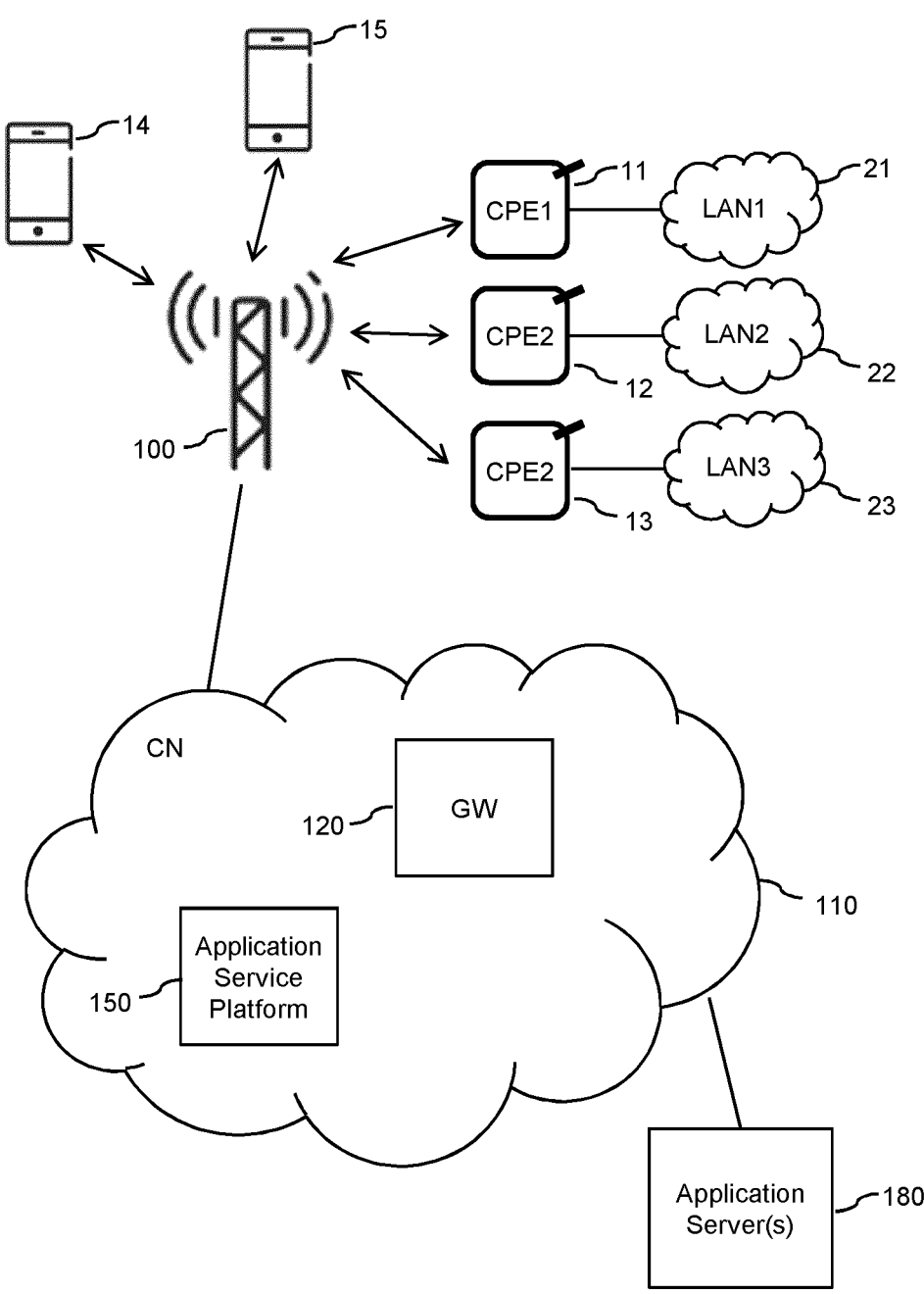
FIG. 1 schematically illustrates a wireless communication network according to an embodiment.

FIG. 1 illustrates an exemplary wireless communication network according to an embodiment. By way of example, FIG. 1 illustrates a RAN node 100 which serves a certain cell of the wireless communication network. It is however noted that the wireless communication network would typically include multiple RAN nodes for serving a plurality of cells. Such multiple RAN nodes may together form a RAN of the wireless communication network. The RAN node 100 may for example correspond to an eNB of the LTE technology or to a gNB of the NR technology.

By way of example, FIG. 1 further illustrates CPE devices 11, 12, 13 and other UEs 10 wirelessly connected by to the wireless communication network. Each of the CPE devices 11, 12, 13 provides network connectivity to further devices, in FIG. 1 represented by a corresponding Local Area Network (LAN) 21, 22, 23. The UEs 14, 15 may correspond to various kinds of wireless communication devices, for example user terminals, such as mobile or stationary computing devices like smartphones, laptop computers, desktop computers, tablet computers, gaming devices, or the like. Further, the UEs 14, 15 could for example correspond to other kinds of wireless communication enabled equipment like smart home devices, printers, multimedia devices, data storage devices, or the like.

As further illustrated, the RAN node 100 may be further connected to a core network (CN) 110 of the wireless communication network. The CN 110 may ensure data connectivity of the LANs 21, 22, 23 and UEs 14, 15 with various other entities, e.g., other UEs connected to the wireless communication network servers, service providers, data sources, data sinks, user terminals, or the like. For this purpose, the CN 110 may include one or more gateways 120.

A wireless connection established between each CPE device 11, 12, 13 and the RAN node 100 may be used for providing various kinds of services to client devices in the LANs 21, 22, 23, e.g., a voice service, a multimedia service, or other data service. Such services may be based on applications which are executed on the client device. By way of example, FIG. 1 illustrates an application service platform 150 provided in the CN 110 and one or more application servers 180 connected to the CN 110. The application(s) executed on the client devices may use the wireless connection of the respective CPE device 11, 12, 13 for data communication with one or more other client devices, UEs 14, 15, the application service platform 150, and/or the application server(s) 180, thereby enabling utilization of the corresponding service(s) at the client device.

As explained above, the CPE devices 11, 12, 13 thus assist in providing a network-based service to one or more client devices. The connection of such client device to the CPE device 11, 12, 13 may be based on various types of network technology, e.g., a wire-based LAN or a Wireless LAN (WLAN).

Figure 2:
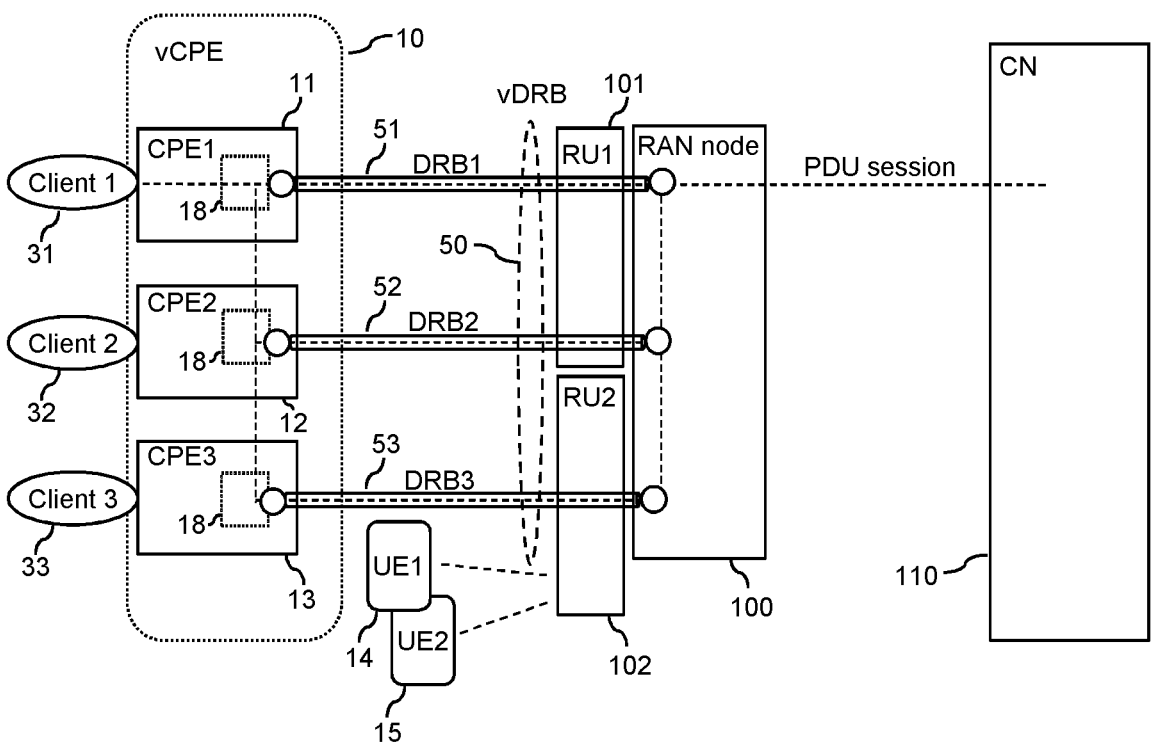
FIG. 2 schematically illustrates an example involving usage of a virtual radio channel according to an embodiment.

FIG. 2 further illustrates an example of a scenario where the multiple CPE devices 11, 12, 13 cooperate in the above-described manner by aggregating multiple radio channels to a virtual radio channel. In the example of FIG. 2, it is assumed that each of the CPE devices 11, 12, 13 provides network connectivity to a corresponding client device 31, 32, 33, in FIG. 1 denoted as "Client 1", "Client 2", and "Client 3". As mentioned above, a local connection between the client device 31, 32, 33 and the corresponding CPE device 11, 12, 13 may be based on a LAN. Further, it is noted that it would of course also be possible that the CPE device 11, 12, 13 provides network connectivity to multiple client devices.

As further illustrated in FIG. 2, each of the CPE devices 11, 12, 13 is connected by a corresponding radio channel 51, 52, 53 to a RAN node 100. The radio channels 51, 52, 53 correspond to DRBs established between the RAN node 100 and the respective CPE device 11, 12, 13. In particular, a first DRB (DRB1) 51 extends between a first CPE device 11 and the RAN node 100, a second DRB (DRB2) 52 extends between a second CPE device 12 and the RAN node 100, and a third DRB (DRB3) 53 extends between a third CPE device 13 and the RAN node 100. The first DRB 51 has a subscriber-side termination at the first CPE device 11 and a network-side termination at the RAN node 100. The second DRB 52 has a subscriber-side termination at the second CPE device 12 and a network-side termination at the RAN node 100. The third DRB 53 has a subscriber-side termination at the third CPE device 13 and a network-side termination at the RAN node 100.

As mentioned above, the RAN node 100 may correspond to an eNB of the LTE technology or a gNB of the NR technology. As further illustrated, the RAN node 100 may be associated with multiple radio units (RUs), e.g., each serving a different cell sector. In the example of FIG. 2, the RAN node 100 is associated with two RUs 101, 102, denoted as RU1 and RU2. The RUs may each be an integral part of the RAN node 100 or may correspond to a remote RU connected to the RAN node 100.

As further illustrated in FIG. 1, the CPE devices 11, 12, 13 cooperate by associating the DRBs 51, 52, 53 to a virtual DRB (vDRB) 50. In the illustrated example, the virtual DRB 50 has the purpose of carrying data of the client device 31 associated with the first CPE device 11. The second CPE device 12 and the third CPE device 13 operate in a relay mode by forwarding data between their respective DRB 52, 53 and the first CPE device 11. The data carried on the vDRB 50 is distributed to the DRBs 51, 52, 53. The DRBs 51, 52, 53 may thus also be regarded as being DRB legs of the vDRB 50. The DRB 51 may be regarded as a primary leg, and the DRBs 52, 53 may be regarded as secondary legs.

Each DRB leg can be served by different physical resources, which can be for example spatially separated beams provided by a static or advanced antenna system of the respective RU 101, 102. For downlink data transmitted from the network towards the client device 31, the distribution to the DRB legs occurs at the RAN node 100. For uplink data transmitted from the client device 31 to the network, the distribution to the DRB legs occurs at the CLE device 11.

The cooperating CPE devices 11, 12, 13 may be regarded as a virtual CPE device (vCPE) 10. Within such virtual CPE device 10, the individual CPE devices 11, 12, 13 may have different roles: As mentioned above, the CPE devices 12, 13 have the purpose of forwarding data from the CPE device 11, and thus have the role of a relay CPE device. The CPE device 11 corresponds to the destination or source of data transmitted on the vDRB 50 and thus has the role of a master CPE device which hosts the connection to the client device 31. The virtual CPE device 10 may for example correspond to a cluster of FWA routers, to a group of vehicles, e.g., in a for platooning scenario, a group of Unmanned Aerial Vehicles (UAVs), or some other group of wireless access devices onboard an AGV, aircraft, or other vehicle, or some other group of UEs providing network connectivity to other devices or systems.

The formation and operation of the virtual CPE device 10 may be transparent from the perspective of the CN 110. In particular, the CN 10 may treat the virtual CPE device 10 based on the same procedures and mechanisms as a regular CPE device 11, 12, 13 or other UE. By way of example, broken lines in FIG. 2 illustrate a PDU session of the client device 31 which is carried by the vDRB 50. As can be seen, the PDU session is jointly carried by the DRB legs of the vDRB 50, without requiring awareness of the multiple DRB legs in the CN 110. The vDRB 50 can have provide the same features and functionalities as a regular DRB of the LTE or NR technology. Such features and functionalities may for example include resource reservation, service differentiation, throughput control, guaranteed bit rate, quality of service (QoS), policy control, or the like.

In the situation illustrated in FIG. 2, each individual CPE 11, 12, 13 can continue to serve its client device 31, 32, 33 in a regular manner, using additional DRBs (not illustrated). In addition, each CPE device 11, 12, 13 supports formation and usage of the vDRB 50.

For supporting the vDRB 50, each CPE device 11, 12, 13 may provide various functionalities. These functionalities may for example relate to maintaining and managing context information, such as maintaining a context of the vDRB 50, maintaining a context of the virtual CPE device 10, addition of a CPE device to the virtual CPE device context, removal of a CPE device from the virtual CPE device context, or management of CPE devices in the virtual CPE device context. The context information may in particular identify the CPE devices forming the vCPE device 10, e.g., in terms of MAC (Medium Access Control) identities. Further, functionalities of the CPE devices may relate to discovery of other CPE devices which support cooperation to provide the vDRB 50 and/or setting up a connection to other CPE devices which support cooperation to provide the vDRB 50. The connection to the other CPE device(s) may be based on WLAN, wire-based LAN, or sidelink communication. Further, functionalities of the CPE devices may relate to the management of roles in the virtual CPE device 10, such as assigning the role of the master CPE device, assigning the role of a relay CPE device. Further, functionalities of the CPE devices may relate to control of data forwarding between the CPE devices of the virtual CPE device 10.

Further, functionalities of the CPE devices may relate to controlling distribution of the uplink data to the DRB legs of the vDRB 50. Further, functionalities of the CPE devices may relate to reconstruction of the data received another cooperating CPE device, e.g., by recombining segmented data, and segmentation of data to be distributed to the DRB legs. Further, functionalities of the CPE devices may relate to requesting, modification, and/or release of the vDRB 50. Further, functionalities of the CPE devices may relate to measuring characteristics of data transport between the cooperating CPE devices, e.g., to be used as a basis for controlling distribution of the data to the DRB legs. Further, functionalities of the CPE devices may relate to measuring characteristics of the DRBs legs, e.g., to be used as a basis for controlling distribution of the data to the DRB legs. Further, functionalities of the CPE devices may relate to scheduling the data traffic on the vDRB 50, in particular with respect to distribution over the individual DRB legs and cooperating CPE devices. Such scheduling may be based on traffic characteristics, robustness requirements, service type, load situation, functionalities of CPE devices, radio conditions, or stored information, e.g., information from a subscriber data base. The master CPE device may be responsible for encrypting the uplink data to be transmitted on the vDRB 50 and for decrypting the uplink data received from the vDRB 50.

Further, also the RAN node 100 may provide various functionalities for supporting the vDRB 50. Such functionalities of the RAN node 100 may for example relate to maintaining and managing context information, such as maintaining a context of the vDRB 50, maintaining a context of the virtual CPE device 10, addition of a CPE device to the virtual CPE device context, removal of a CPE device from the virtual CPE device context, or management of CPE devices in the virtual CPE device context. The context information may in particular identify the CPE devices forming the vCPE device 10, e.g., in terms of MAC identities. Further, the functionalities of the RAN node 100 may include scheduling uplink traffic on the vDRB 50, e.g., by providing uplink grants per DRB leg to the respective CPE device, as well as scheduling downlink traffic on the vDRB 50, e.g., by providing downlink scheduling information per DRB leg to the respective CPE device. Further, the functionalities of the RAN node 100 may include applying load balancing and redundancy rules for the distribution of the data to the DRB legs. Further, the functionalities of the RAN node 100 may include requesting, paging, modification and/or releasing of the vDRB 50. Further, functionalities of the RAN node 100 may relate to measuring characteristics of the DRBs legs, e.g., to be used as a basis for controlling distribution of the data to the DRB legs. Further, functionalities of the RAN node 100 may include scheduling the data traffic on the vDRB 50, in particular with respect to distribution over the individual DRB legs and cooperating CPE devices. Such scheduling may be based on traffic characteristics, robustness requirements, service type, load situation, functionalities of CPE devices, radio conditions, or stored information, e.g., information from a subscriber data base. Further, the RAN node 100 may be responsible for encrypting the downlink data to be transmitted on the vDRB 50 and for decrypting the downlink data received from the vDRB 50.

As regards the scheduling of data traffic on the vDRB 50, the RAN node 100 may coordinate the allocation of radio resources, e.g., in terms of Resource Blocks (RBs), of the individual DRB legs. This may for example also include the possibility of allocating all RBs that are available for the vDRB 50 to one of the DRB legs or the possibility of evenly distributing the available RBs over the DRB legs, depending on the expected achievable performance of the vDRB 50.

In some cases, the scheduling of data traffic on the vDRB 50 may also involve scheduling redundant transmissions of at least some of the data. Such redundant transmissions may provide increased robustness, e.g., in terms of a lower risk of transmission failure or data loss and/or a lower delay, which may for example be beneficial in the case of certain industrial use cases like in an AGV.

In the scenario of FIG. 2, a downlink data flow of the PDU session can be handled in the following way: The downlink data is received in the CN 110, e.g., by the above-mentioned gateway 120. Based on an IP (Internet Protocol) address of the virtual CPE device 10, the downlink data is forwarded to the RAN node 100 serving the virtual CPE device 10. The context information stored by the RAN node 100 indicates that multiple CPE devices 11, 12, 13 serve the virtual CPE device 10. If the vDRB 50 is not yet established, e.g., because the virtual CPE device 10 is in idle mode, the RAN node 100 may page the virtual CPE device 10 to trigger establishment of the vDRB 50 for serving the PDU session. The RAN node 100 may buffer the downlink data to be transmitted on the vDRB 50 and utilize measurements and other information on the individual DRB legs when scheduling transmissions of the downlink data on the different DRB legs.

The RAN node 100 may for example use measurements performed by the RAN node 100 itself or reported from the CPE devices 11, 12, 13 to assess the radio conditions and load of each DRB leg. Based on that information, the RAN node 100 can apply a suitable scheduling strategy to fairly schedule the transmissions of the downlink data. By way of example, FIG. 2 indicates the presence of additional UEs 14, 15 within coverage of the RU 102. The RBs allocated to the UEs 14, 15 may thus be in the same spatial domain, e.g., beam or spatial layer, as the RUs allocated to the third DRB 53. Since the scheduling strategy should fairly treat the UEs 14, 16 and the virtual CPE device 10, the RAN node 100 may decide to predominantly schedule the data transmissions to the virtual CPE device 10 on the first and second DRBs 51, 52, and not on the third DRB 53, which is served by the same RU 102 as the UEs 14, 15. If UEs 14, 15 are no longer present or become inactive, the RAN node 100 may in turn decide to schedule the data transmissions to the virtual CPE device 10 also on the third DRB 53, thereby enhancing the data throughput that is achievable for the virtual CPE device 10.

It is noted that the handling of an uplink data flow of the PDU session can be handled in a corresponding manner, based on scheduling decisions by the RAN node 100. The distribution of the uplink data to the DRB legs of the vDRB 50 would then occur at the CPE device 11, e.g., based on uplink buffer status information of the DRB legs reported by the second and third CPE devices 12, 13.

Figure 3:
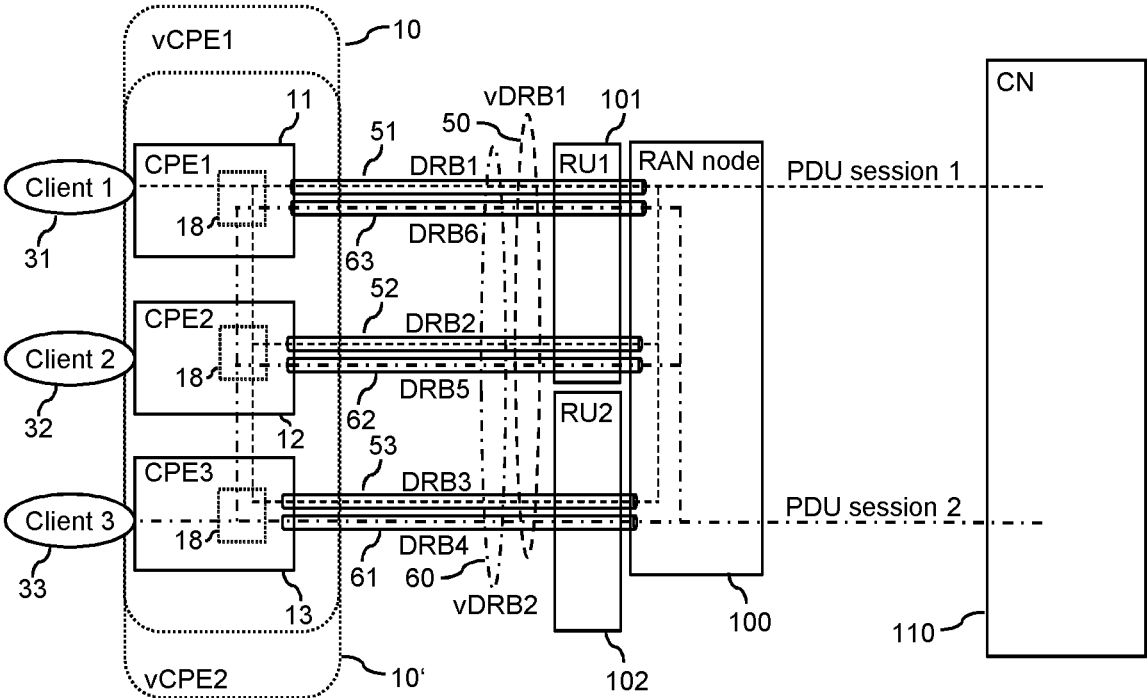
FIG. 3 schematically illustrates an example involving usage of multiple virtual radio channels according to an embodiment.

It is noted that the same CPE device may also have different roles in a virtual CPE device. FIG. 3 illustrates an example of a corresponding situation. Like in the example of FIG. 2, the CPE devices 11, 12, 13 cooperate to form a first virtual CPE device (vCPE1) 10 connected by a first virtual DRB (vDRB1) 50 to the RAN node 100. The first virtual CPE device 10 serves the client device 31. A first PDU session (PDU session 1) is established between the CN 110 and the first virtual CPE device 10. Further, the CPE devices 11, 12, 13 cooperate to form a second virtual CPE device (vCPE2) 10' connected by a second vDRB 60 to the RAN node 100. The second virtual CPE device 10 serves the client device 33. For the first virtual CPE device 10, the first CPE device 11 acts as the master CPE device which hosts the connection to the client device 31, and the second and third CPE devices 12, 13 act as relay CPE devices. For the second virtual CPE device 10', the third CPE device 13 acts as the master CPE device which hosts the connection to the client device 33, and the first and second CPE devices 11, 12 act as relay CPE devices.

For forming the second vDRB 60, a fourth DRB (DRB4) 61 extends between the third CPE device 13 and the RAN node 100, a fifth DRB (DRB5) 62 extends between a second CPE device 12 and the RAN node 100, and a sixth DRB (DRB6) 63 extends between a first CPE device 13 and the RAN node 100. The fourth DRB 61 has a subscriber-side termination at the third CPE device 13 and a network-side termination at the RAN node 100. The fifth DRB 62 has a subscriber-side termination at the second CPE device 12 and a network-side termination at the RAN node 100. The sixth DRB 63 has a subscriber-side termination at the first CPE device 11 and a network-side termination at the RAN node 100. The fourth, fifth, and sixth DRBs form DRB legs of the second vDRB.

Figure 4:
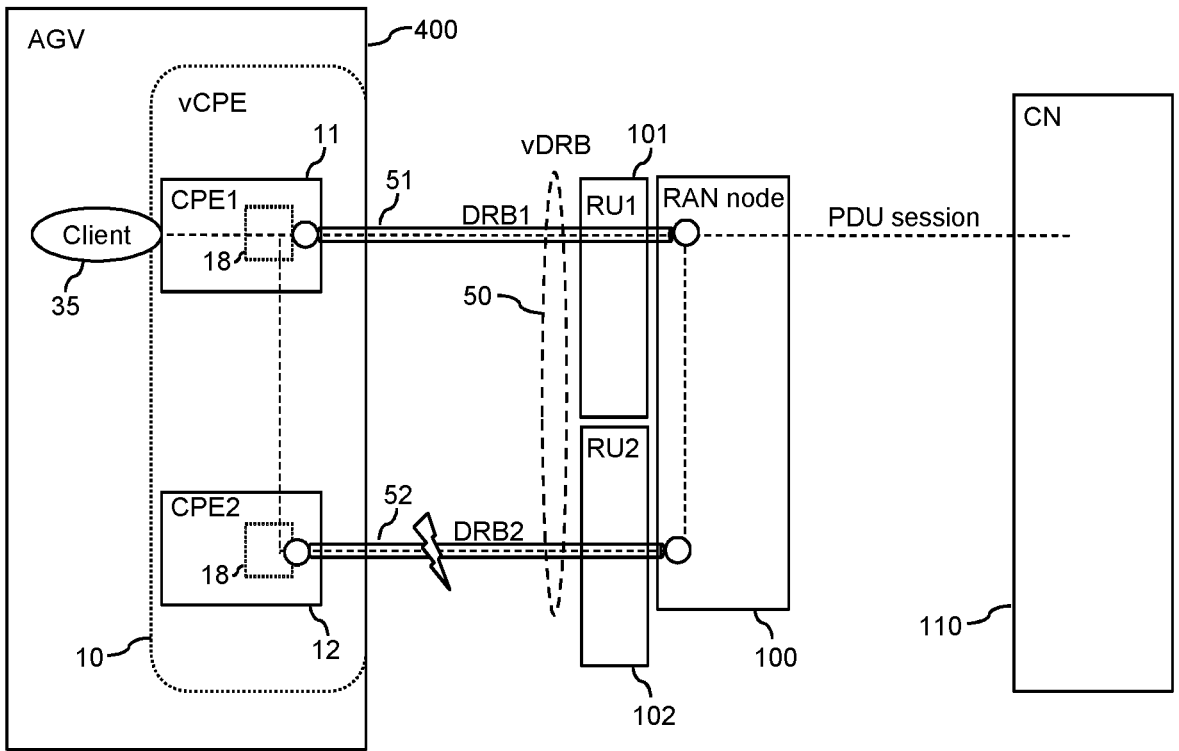
FIG. 4 schematically illustrates an example involving usage of a virtual radio channel according to an embodiment to enhance connectivity robustness of an AGV.

FIG. 4 further illustrates an example of a scenario where a virtual CPE device 10 and vDRB 50 are used to provide enhanced robustness of network connectivity of an AGV 400. In the example of FIG. 4, a first CPE devices 11 and a second CPE device 12 cooperate to form a virtual CPE device (vCPE) 10 connected by a virtual DRB (vDRB) 50 to the RAN node 100, similar to the scenario of FIG. 2. The virtual CPE device 10 serves a client device 35. For forming the vDRB 50, a first DRB (DRB1) 51 extends between the first CPE device 11 and the RAN node 100, and a second DRB (DRB2) 52 extends between the second CPE device 12 and the RAN node 100. The first DRB 51 has a subscriber-side termination at the first CPE device 11 and a network-side termination at the RAN node 100. The second DRB 52 has a subscriber-side termination at the second CPE device 12 and a network-side termination at the RAN node 100. A PDU session is established between the CN 110 and the virtual CPE device 10. In the scenario of FIG. 4, the first CPE device 11 acts as the master CPE device which hosts the connection to the client device 35, and the second CPE device 12 acts as a relay CPE device. The CPE devices 11, 12 act as redundant data gateway devices onboard the AGV 400, thereby achieving higher robustness, e.g., with respect to failure or performance loss of the DRBs 51, 52. The DRBs 51, 52 may be scheduled for redundant transmissions of data. In the example of FIG. 4, the DRBs 51, 52 are served by different RUs 101, 102, and the redundant transmissions could thus for example be based on simultaneously scheduling redundant transmissions of the same data on the first DRB 51 and the second DRB 52, using a Multi-User MIMO (Multiple Input/Multiple Output) transmission mode of the two RUs 101, 102. By way of example, FIG. 4 indicates a disturbance on the second DRB 52. Due to the disturbance, the second CPE device 12 may receive corrupted downlink data and discard the corrupted downlink data. In some cases, reception of downlink data by the second CPE device 12 could also completely fail. As compared to that, first CPE device 11 may successfully receive the redundant transmission of the downlink data and provide the downlink data to the client. In the case of uplink data, the RAN node may operate in a corresponding manner and discard corrupted data received on the DRB 52 and forward uplink data successfully received on the DRB 51.

A procedure for discovery of CPE devices which may cooperate to form a virtual CPE device may for example be performed on power-on of a CPE device supporting cooperation in a virtual CPE device. The discovery procedure may be based on a message handshake between two CPE devices, e.g., using messages transmitted via Bluetooth communication, sidelink communication, or WLAN communication. Further, such message handshake could also be triggered when setting up a wire-based LAN connection between two CPE devices.

During the discovery procedure, a CPE device intended to provide network connectivity by a virtual DRB is declared as a master CPE device in a virtual CPE device, while other CPE devices may be assigned the role of a relay CPE device in the virtual CPE device. Further, the CPE devices may exchange capability information and connectivity information. The capability information and connectivity information may then be used to define a data transport layer topology of the virtual CPE device, e.g., by configuring switching tables in each CPE devices.

Further, each CPE device cooperating in the virtual CPE device creates and maintains context information of the virtual CPE device. The context information may include identities of the CPE devices cooperating in the virtual CPE device, the role of each CPE device, and the data transport layer topology, e.g., in terms of MAC identifiers and switching tables.

Figure 5A:
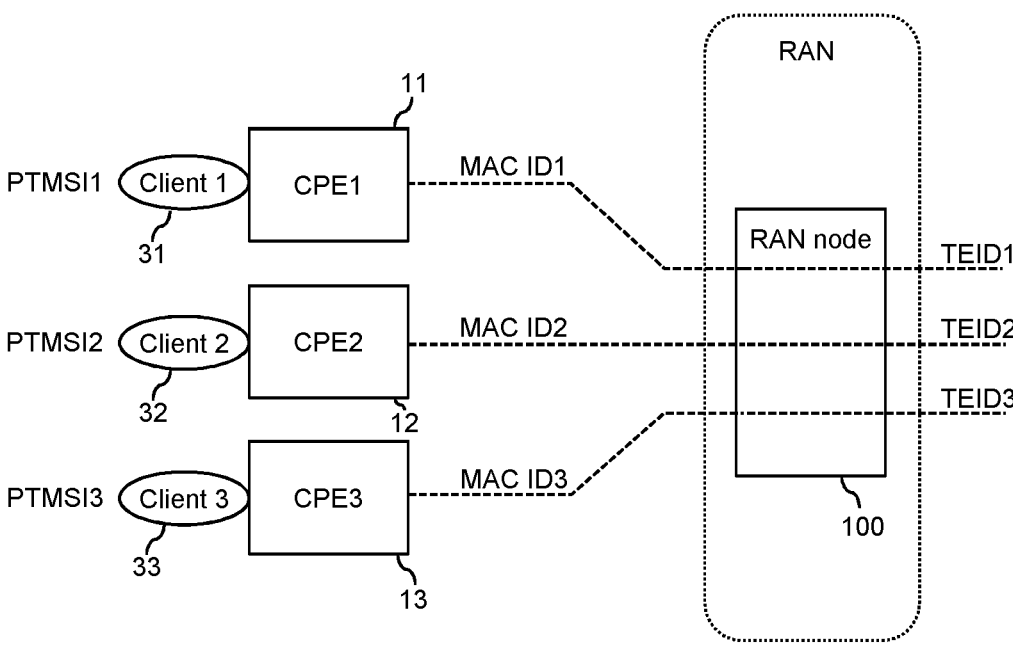
FIGS. 5A and 5B schematically illustrate protocol aspects of associating multiple radio channels to a virtual radio channel according to an embodiment.
Figure 5B:
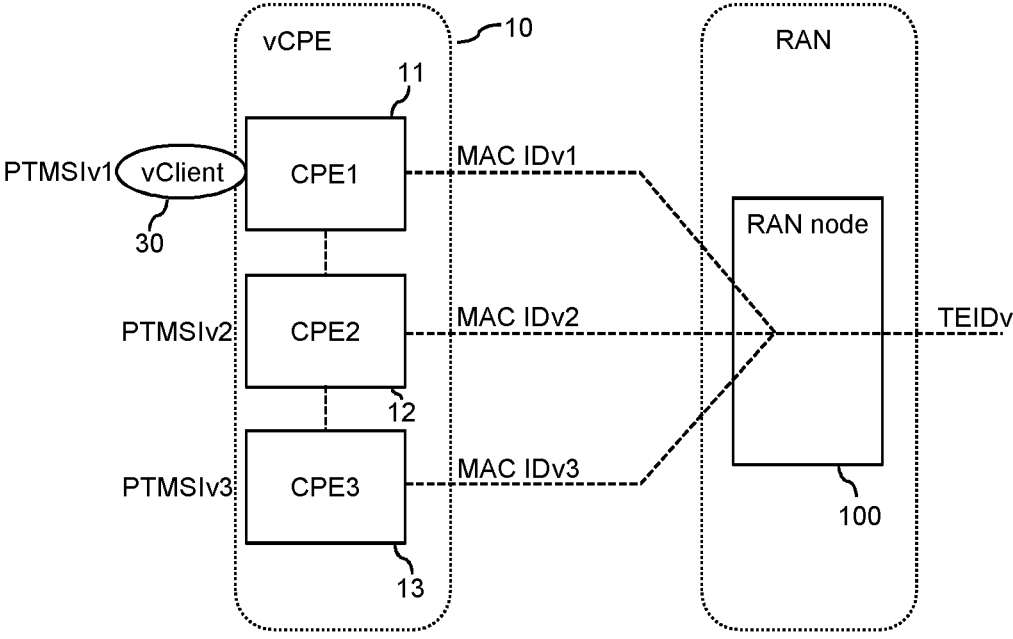

FIGS. 5A and 5B further illustrate an initial attach of a virtual CPE device to the wireless communication network. The example of FIGS. 5A and 5B assumes a virtual CPE device 10 which is formed of a first CPE device 11, a second CPE device 12, and a third CPE device 13, similar to the example of FIG. 2. As illustrated in FIG. 5A, each CPE device connects to the RAN node 100. For this purpose, each CPE device 11, 12, 13 may performs a random access for initial attach as specified for the LTE technology or NR technology. As a result, each CPE device 11, 12, 13 obtains a corresponding PTMSI for paging and a MAC identity (or MAC address) to be used within the cell served by the RAN node 100. In the illustrated example, the first CPE device 11 is assigned a first PTMSI denoted as PTMSI1 and a first MAC identity denoted as MAC ID 1, the second CPE device 12 is assigned a second PTMSI denoted as PTMSI2 and a second MAC identity denoted as MAC ID 2, and the third CPE device 13 is assigned a third PTMSI denoted as PTMSI3 and a third MAC identity denoted as MAC ID 3. In the RAN node 100, the first MAC identity is mapped to a first tunnel endpoint identifier (TEID) denoted as TEID1, the second MAC identity is mapped to a second TEID denoted as TEID2, and the third MAC identity is mapped to a third TEID denoted as TEID3.

In a next step, illustrated by FIG. 5B, the virtual CPE device 10 connects to the RAN node 100. For that purpose, each CPE device 11, 12, 13 performs a further initial random access for the the virtual CPE device 10, thereby obtaining a respective further PTMSI and MAC identity assigned to the virtual CPE device 10. In the illustrated example, the first CPE device 11 is assigned a first PTMSI of the virtual CPE device 10, denoted as PTMSIv1, and a first MAC identity of the virtual CPE device 10, denoted as MAC IDv1, the second CPE device 12 is assigned a second PTMSI of the virtual CPE device 10, denoted as PTMSIv2, and a second MAC identity of the virtual CPE device 10, denoted as MAC ID 2, and the third CPE device 13 is assigned a third PTMSI of the virtual CPE device 10, denoted as PTMSI3, and a third MAC identity of the virtual CPE device 10, denoted as MAC ID 3. In the RAN node 100, the first MAC identity of the virtual CPE device 10, the second MAC identity of the virtual CPE device 10, and the third MAC identity of the virtual CPE device 10 are mapped to a TEID assigned to the virtual CPE device 10, denoted as TEIDv.

Based on the initial attach of the virtual CPE device 10, also the RAN node 100 creates context information for the virtual CPE device 10. The context information associates the CPE devices 11, 12, 13 and corresponding identifiers to the virtual CPE device 10 an maps the MAC identities of the virtual CPE device 10 to the TEID assigned to the virtual CPE device 10.

Figure 6:
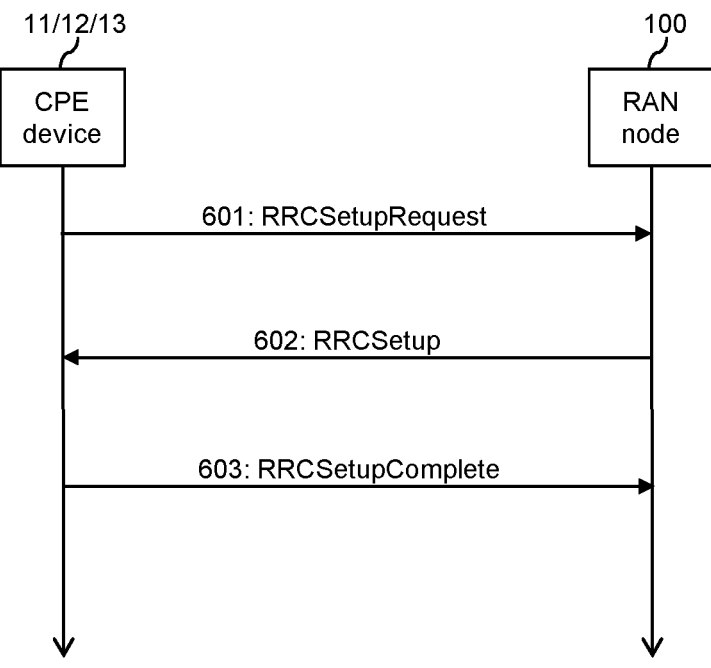
FIG. 6 illustrates an example of Radio Resource Control (RRC) signaling as utilized according to an embodiment.

In the RAN node 100, associating the CPE devices 11, 12, 13 and corresponding identifiers to the virtual CPE device 10 can be triggered by providing corresponding information in a message of an RRC signaling used when establishing the connection between the virtual CPE device 10 and the RAN node 100. For example, such RRC signaling may correspond to an RRC connection setup procedure as illustrated in FIG. 6. As illustrated in FIG. 6, the RRC connection setup procedure involves that the CPE device 11, 12, 13 sends an RRCSetupRequest message 601 to the RAN node 100, to which the RAN node 100 responds with an RRC-Setup message 602. The CPE device 11, 12, 13 then confirms setup of the RRC connection by sending an RRCSetupComplete message 603 to the RAN node 100. Sending of the RRCSetupRequest message 601 may include a random access part, including transmission of a random access preamble (message 1) by the CPE device 11, 12, 13, transmission of an initial resource assignment (message 2) by the RAN node 100, and transmission of the actual RRCSetupRequest (message 3) on resources assigned by the initial resource assignment. Here, the RRCSetupRequest, i.e., message 3, may indicate that cause of establishment of the RRC connection is setup of a DRB for the virtual CPE device 10. Further, the RRCSetupRequest could also indicate whether the CPE device 11, 12, 13 will act as a master CPE device or as a relay CPE device. Corresponding indications can be included in an establishmentCause field of the RRCSetupRequest. Further, if the CPE device 11, 12, 13 has the role of a relay CPE device, the RRCSetupRequest could also indicate the master CPE device of the virtual CPE device, e.g., in terms of the PTMSI assigned to the master CPE device. The CPE device 11, 12, 13 may receive corresponding information during the handshake exchange of information during discovery and formation of the virtual CPE device 10. Based on the information exchanged between the CPE devices 11, 12, 13 of the virtual CPE device 10 and the RAN 100, the RAN node 100 and the CPE devices 11, 12, 13 define a data transport layer topology of the virtual DRB between the virtual CPE device 10 and the RAN node 100.

The context information stored by the RAN node 100 also binds the CPE devices 11, 12, 13 of the virtual CPE device 10 and the corresponding identifiers to a GTP (General Packet Radio Service) Tunneling Protocol session established with the CN 110. As mentioned above, this may in particular involve mapping the MAC identifiers of the virtual CPE device 10 to a TEID. Accordingly, the context information maintained by the RAN node may include the MAC identities of the virtual CPE device 10, as assigned to the individual CPE devices 11, 12, 13 forming the virtual CPE device 10. Further, the context information may include the RRC identities of the virtual CPE device 10, as assigned to the individual CPE devices 11, 12, 13 forming the virtual CPE device 10, e.g., in terms of PTMSIs. In addition, the context information may also include information on the status, load, or other conditions of each DRB leg of the vDRB. Based on such information, the RAN node 100 may supervise establishment and quality of each DRB leg, may perform load balancing decisions and/control redundant transmissions of data on multiple DRB legs for increased robustness. In some cases, the context information stored by the RAN node 100 may also include information related to management of redundant transmissions of data on multiple DRB legs for increased robustness, e.g., information indicating whether or when to use the redundant transmissions. Such information may be subscription based and/or may be dynamically determined by the RAN node 100 or the virtual CPE device 10, e.g., depending on measured radio conditions or depending on an operating mode of the client device(s) served by the virtual CPE device 10.

Figure 7:
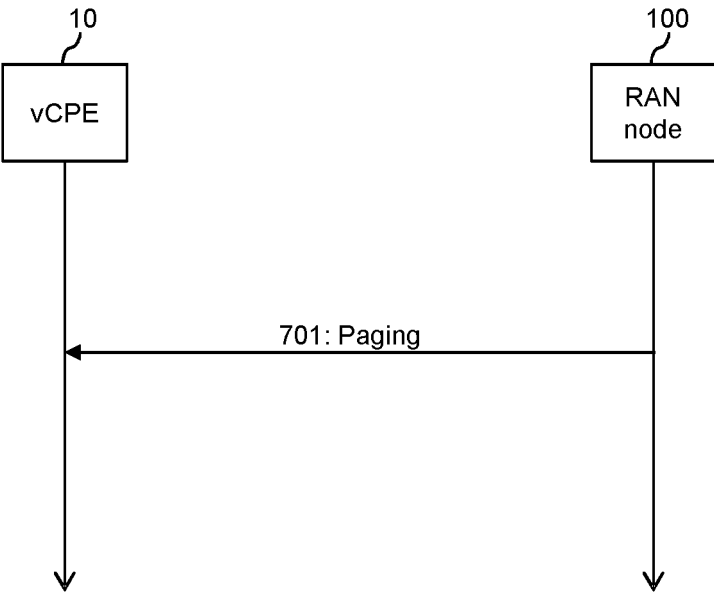
FIG. 7 schematically illustrates an example of a paging procedure according to an embodiment.

In some cases, the RAN node 100 may also perform paging of the virtual CPE device 10 in order to initiate a downlink data transfer to the virtual CPE device 10. FIG. 7 illustrates an example of a corresponding paging procedure. As illustrated, the paging procedure involves that the RAN node 100 sends a paging message 701 to the virtual CPE device 10. The paging message 701 may be addressed to the PTMSIs of the virtual CPE device 10 as stored in the context information maintained by the RAN node 100. In response to the paging message 701, each CPE device 11, 12, 13 forming the virtual CPE device 10 may initiate setup of the DRB corresponding DRB leg of the vDRB for the virtual CPE device 10.

If establishment of the vDRB is needed for a transfer of uplink data, RRC connection setup for the virtual CPE device 10 may be triggered by the master CPE device, e.g., using processes as explained in connection with FIGS. 5A, 5B and 6.

Figure 8:
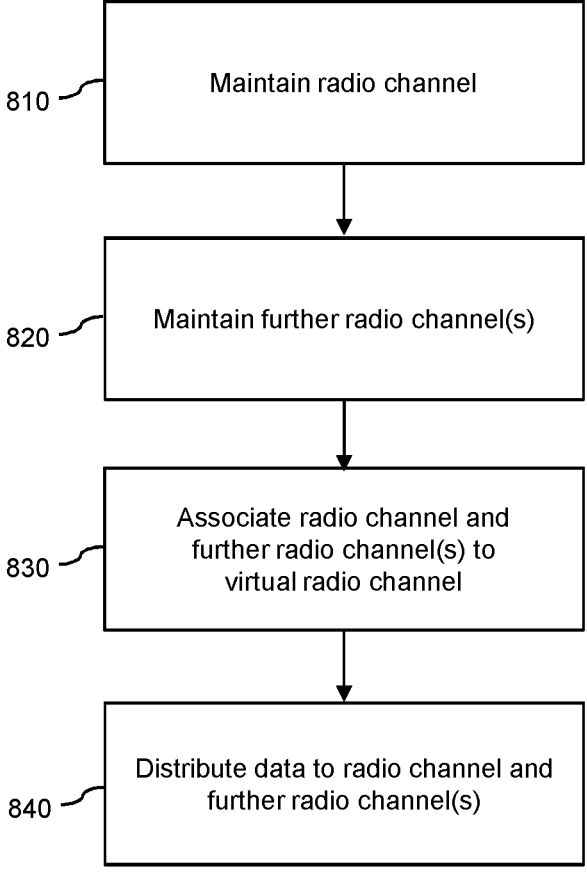
FIG. 8 shows a flowchart for schematically illustrating a method according to an embodiment.

FIG. 8 shows a flowchart for illustrating a method, which may be utilized for implementing the illustrated concepts. The method of FIG. 8 may be used for implementing the illustrated concepts in a RAN node of a wireless communication network, e.g., corresponding to the above-mentioned RAN node 100.

If a processor-based implementation of the RAN node is used, at least some of the steps of the method of FIG. 8 may be performed and/or controlled by one or more processors of the RAN node. Such RAN node may also include a memory storing program code for implementing at least some of the below described functionalities or steps of the method of FIG. 8.

At step 810, the RAN node maintains a radio channel having a network-side termination at the RAN node and a subscriber-side termination at a wireless access device. The wireless access device may correspond to one of the above-mentioned CPE devices, in particular a CPE device having the role of a master CPE device, such as the CPE device 11 in the scenario of FIG. 2 or the CPE devices 11 and 13 in the scenario of FIG. 3. The radio channel may correspond to a DRB, such as the above-mentioned DRBs 51, 61.

At step 820, the RAN node maintains one or more further radio channels each having a network-side termination at the RAN node and a respective subscriber-side termination at a respective further wireless access device. The further wireless access devices may correspond to one or more of the above-mentioned CPE devices, in particular one or more CPE devices having the role of a relay CPE device, such as the CPE devices 12, 13 in the scenario of FIG. 2 or the CPE devices 11, 12, and 13 in the scenario of FIG. 3. The radio channel may correspond to a DRB, such as the above-mentioned DRBs 52, 53, 62, 63.

At step 830, the RAN node associates the radio channel and the one or more further radio channels to a virtual radio channel for carrying data between the RAN node and the wireless access device. For the virtual radio channel, the one or more further wireless access devices are assigned for forwarding data between the wireless access device and the respective further radio channel having its subscriber-side termination at the further wireless access device. The above-mentioned vDRBs 50, 60 are examples of such virtual radio channel.

The radio channel may be mapped to a MAC identity of the wireless access device, and the one or more further radio channels may each be mapped to a respective further MAC identity of the further wireless access device where the further radio channel has its subscriber-side termination. Associating of the radio channel and the one or more further radio channels to the virtual radio channel may then be based on associating the MAC identity and the one or more further MAC identities to a virtual wireless access device. Further, the radio channel may be mapped to a PTMSI of the wireless access device, and the one or more further radio channels may each be mapped to a respective further PTMSI of the further wireless access device where the further radio channel has its subscriber-side termination. Associating of the radio channel and the one or more further radio channels to the virtual radio channel may then be based on associating the PTMSI and the one or more further PTMSIs to the virtual wireless access device. Further, the MAC identity and the one or more further MAC identities may be mapped to a TEID of the virtual wireless access device.

In some scenarios, the RAN node may receive at least one RRC message from at least one of the wireless access device and the one or more further wireless access devices. Associating of the radio channel and the one or more further radio channels to the virtual radio channel may then be based on information indicated in the at least one RRC message. The above-mentioned RRCSetupRequest message 601 is an example of such RRC message.

At step 840, the RAN node may distribute the data to the radio channel and the one or more further radio channels. For this purpose, the RAN node may perform load balancing. For example, the RAN node may estimating characteristics of the radio channel and the one or more further radio channels and perform the load balancing is based on the estimated characteristics of the radio channel and the one or more further radio channels. The estimated characteristics may for example include measured or expected load, or measured or expected radio conditions.

In some scenarios, at least a part of the data is distributed redundantly to the radio channel and the one or more further radio channels, e.g., as explained in connection with FIG. 4.

In some scenarios, the wireless access device and the one or more further wireless access devices may correspond to CPE-FWA devices. Alternatively, the wireless access device and the one or more further wireless access devices are onboard a vehicle, e.g., a road vehicle, a train, a water vehicle, or an aircraft. In some cases, the wireless access device and the one or more further wireless access devices may act as redundant gateways on the same vehicle, e.g., as explained in connection with FIG. 4. In other cases, each wireless access device could be on a different vehicle, e.g., in the case of a scenario involving platooning of multiple vehicles.

Figure 9:
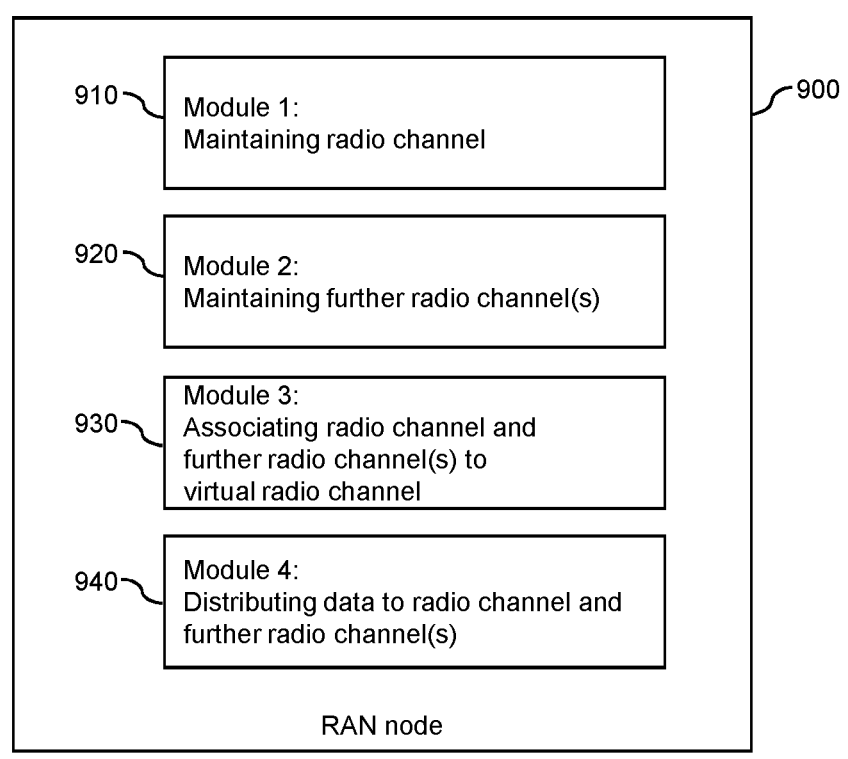
FIG. 9 shows a block diagram for schematically illustrating functionalities of a RAN node according to an embodiment.

FIG. 9 shows a block diagram for illustrating functionalities of a RAN node 900 which operates according to the method of FIG. 8. The RAN node 900 may for example correspond to the above-mentioned RAN node 100. As illustrated, the RAN node 900 may be provided with a module 910 configured to maintain a radio channel to a wireless access device, such as explained in connection with step 810. Further, the RAN node 900 may be provided with a module 920 configured to maintain one or more further radio channels, such as explained in connection with step 820. Further, the RAN node 900 may be provided with a module 930 configured to associate the radio channel and the one or more further radio channels to a virtual radio channel, such as explained in connection with step 830. Further, the RAN node 900 may be provided with a module 940 configured to distribute data to the radio channel and the one or more further radio channels, such as explained in connection with step 840.

It is noted that the RAN node 900 may include further modules for implementing other functionalities, such as known functionalities of an eNB of the LTE technology or of a gNB of the NR technology. Further, it is noted that the modules of the RAN node 900 do not necessarily represent a hardware structure of the wireless RAN node 900, but may also correspond to functional elements, e.g., implemented by hardware, software, or a combination thereof.

Figure 10:
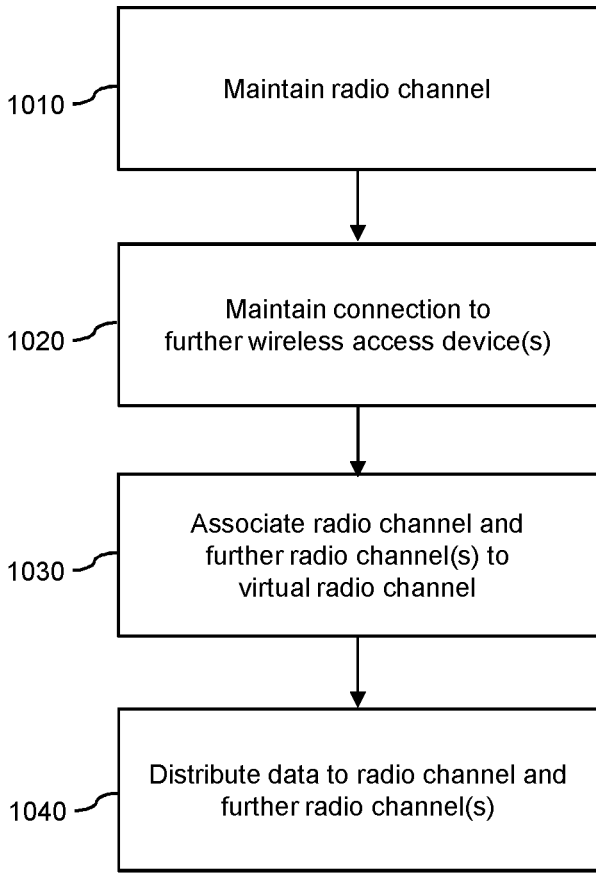
FIG. 10 shows a flowchart for schematically illustrating a further method according to an embodiment.

FIG. 10 shows a flowchart for illustrating a method, which may be utilized for implementing the illustrated concepts. The method of FIG. 10 may be used for implementing the illustrated concepts in a wireless access device. The wireless access device may correspond to one of the above-mentioned CPE devices, in particular a CPE device having the role of a master CPE device, such as the CPE device 11 in the scenario of FIG. 2 or the CPE devices 11 and 13 in the scenario of FIG. 3.

If a processor-based implementation of the wireless access device is used, at least some of the steps of the method of FIG. 10 may be performed and/or controlled by one or more processors of the wireless access device. Such wireless access device may also include a memory storing program code for implementing at least some of the below described functionalities or steps of the method of FIG. 10.

At step 1010, the wireless access device maintains a radio channel having a subscriber-side termination at the wireless access device and a network-side termination at a RAN node. The RAN node may for example correspond to the above-mentioned RAN node 100. The radio channel may correspond to a DRB, such as the above-mentioned DRBs 51, 61.

At step 1020, the wireless access device access device maintains a connection to one or more further wireless access devices. The one or more further wireless access devices each maintain a respective further radio channel having a subscriber-side termination at the further wireless access device and a network-side termination the RAN node. The further wireless access devices may correspond to one or more of the above-mentioned CPE devices, in particular one or more CPE devices having the role of a relay CPE device, such as the CPE devices 12, 13 in the scenario of FIG. 2 or the CPE devices 11, 12, and 13 in the scenario of FIG. 3. The radio channel may correspond to a DRB, such as the above-mentioned DRBs 52, 53, 62, 63. The connection maintained at step 1020 may be a local wireless connection, e.g., based on WLAN communication or side-link communication. Alternatively, the connection maintained at step 1020 could be a wire-based connection.

At step 1030, the wireless access device associates the radio channel and the one or more further radio channels to a virtual radio channel for carrying data between the wireless access device and the RAN node. For the virtual radio channel, the one or more further wireless access devices are assigned for forwarding data between the wireless access device and the respective further radio channel having its subscriber-side termination at the further wireless access device. The above-mentioned vDRBs 50, 60 are examples of such virtual radio channel.

The radio channel may be mapped to a MAC identity of the wireless access device, and the one or more further radio channels may each be mapped to a respective further MAC identity of the further wireless access device where the further radio channel has its subscriber-side termination. Associating of the radio channel and the one or more further radio channels to the virtual radio channel may then be based on associating the MAC identity and the one or more further MAC identities to a virtual wireless access device. Further, the radio channel may be mapped to a PTMSI of the wireless access device, and the one or more further radio channels may each be mapped to a respective further PTMSI of the further wireless access device where the further radio channel has its subscriber-side termination. Associating of the radio channel and the one or more further radio channels to the virtual radio channel may then be based on associating the PTMSI and the one or more further PTMSIs to the virtual wireless access device. Further, the MAC identity and the one or more further MAC identities may be mapped to a TEID of the virtual wireless access device.

In some scenarios, the wireless access device may send at least one RRC message to the RAN node. Associating of the radio channel and the one or more further radio channels to the virtual radio channel may then be based on information indicated in the at least one RRC message. The above-mentioned RRCSetupRequest message 601 is an example of such RRC message.

At step 1040, the wireless access device may distribute the data to the radio channel and the one or more further radio channels. Distributing the data to the radio channel and the one or more further radio channels may be based on load balancing, e.g., load balancing controlled by the RAN node. In some scenarios, at least a part of the data is distributed redundantly to the radio channel and the one or more further radio channels, e.g., as explained in connection with FIG. 4.

In some scenarios, the wireless access device and the one or more further wireless access devices may correspond to CPE-FWA devices. Alternatively, the wireless access device and the one or more further wireless access devices are onboard a vehicle, e.g., a road vehicle, a train, a water vehicle, or an aircraft. In some cases, the wireless access device and the one or more further wireless access devices may act as redundant gateways on the same vehicle, e.g., as explained in connection with FIG. 4. In other cases, each wireless access device could be on a different vehicle, e.g., in the case of a scenario involving platooning of multiple vehicles.

Figure 11:
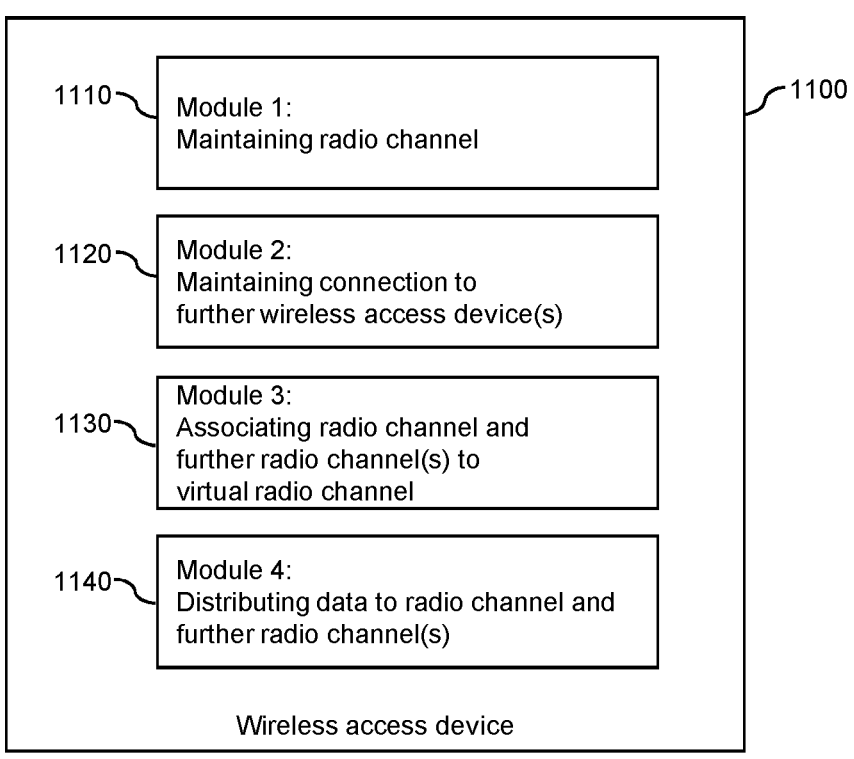
FIG. 11 shows a block diagram for schematically illustrating functionalities of a wireless access device according to an embodiment.

FIG. 11 shows a block diagram for illustrating functionalities of a wireless access device 1100 which operates according to the method of FIG. 10. The wireless access device 1100 may for example correspond to one of the above-mentioned CPE devices, in particular a CPE device having the role of a master CPE device, such as the CPE device 11 in the scenario of FIG. 2 or the CPE devices 11 and 13 in the scenario of FIG. 3. As illustrated, the wireless access device 1100 may be provided with a module 1110 configured to maintain a radio channel to a RAN node, such as explained in connection with step 1010. Further, the wireless access device 1100 may be provided with a module 1120 configured to maintain a connection to one or more further wireless access devices, such as explained in connection with step 1020. Further, the wireless access device 1100 may be provided with a module 1130 configured to associate the radio channel and the one or more further radio channels to a virtual radio channel, such as explained in connection with step 1030. Further, the wireless access device 1100 may be provided with a module 1140 configured to distribute data to the radio channel and the one or more further radio channels, such as explained in connection with step 1040.

It is noted that the wireless access device 1100 may include further modules for implementing other functionalities, such as known functionalities of an FWA-CPE device or known functionalities of a UE in the LTE technology or NR technology. Further, it is noted that the modules of the wireless access device 1100 do not necessarily represent a hardware structure of the wireless access device 1100, but may also correspond to functional elements, e.g., implemented by hardware, software, or a combination thereof.

Figure 12:
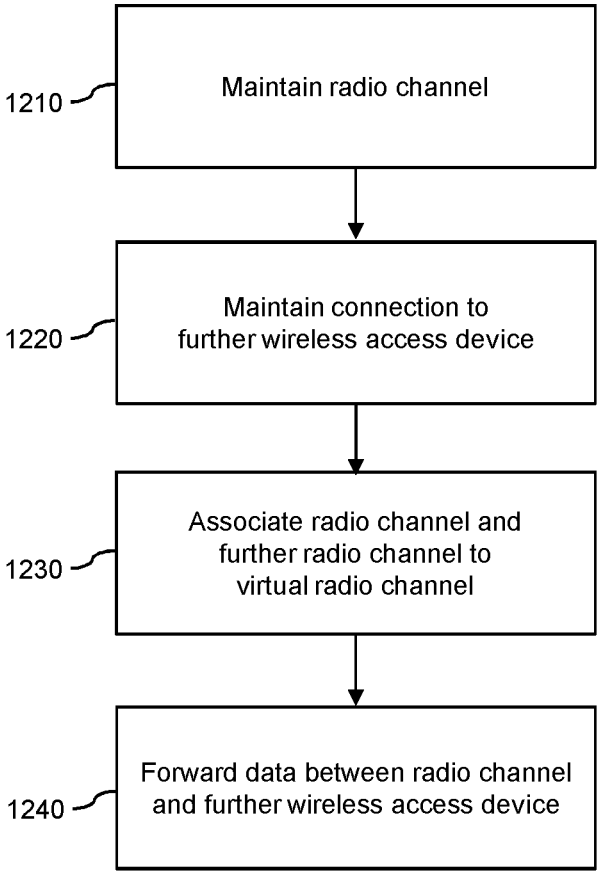
FIG. 12 shows a flowchart for schematically illustrating a further method according to an embodiment.

FIG. 12 shows a flowchart for illustrating a method, which may be utilized for implementing the illustrated concepts. The method of FIG. 12 may be used for implementing the illustrated concepts in a wireless access device. The wireless access device may correspond to one of the above-mentioned CPE devices, in particular a CPE device having the role of a relay CPE device, such as the CPE devices 12, 13 in the scenario of FIG. 2 or the CPE devices 11, 12, and 13 in the scenario of FIG. 3.

If a processor-based implementation of the wireless access device is used, at least some of the steps of the method of FIG. 12 may be performed and/or controlled by one or more processors of the wireless access device. Such wireless access device may also include a memory storing program code for implementing at least some of the below described functionalities or steps of the method of FIG. 12.

At step 1210, the wireless access device maintains a radio channel having a subscriber-side termination at the wireless access device and a network-side termination at a RAN node. The RAN node may for example correspond to the above-mentioned RAN node 100. The radio channel may correspond to a DRB, such as the above-mentioned DRBs 52, 53, 62, 63.

At step 1220, the wireless access device access device maintains a connection to a further wireless access device. The further wireless access device maintains a further radio channel having a subscriber-side termination at the further wireless access device and a network-side termination at the RAN node. The further wireless access device may correspond to one of the above-mentioned CPE devices, in particular a CPE device having the role of a master CPE device, such as the CPE device 11 in the scenario of FIG. 2 or the CPE devices 11 and 13 in the scenario of FIG. 3. The radio channel may correspond to a DRB, such as the above-mentioned DRBs 51, 61. The connection maintained at step 1220 may be a local wireless connection, e.g., based on WLAN communication or sidelink communication. Alternatively, the connection maintained at step 1220 could be a wire-based connection.

At step 1230, the wireless access device associates the radio channel and the further radio channel to a virtual radio channel for carrying data between the further wireless access device and the RAN node. For the virtual radio channel, the wireless access devices is assigned for forwarding data between the wireless access device and the radio channel having its subscriber-side termination at the wireless access device. The above-mentioned vDRBs 50, 60 are examples of such virtual radio channel.

The radio channel may be mapped to a MAC identity of the wireless access device, and the further radio channel may be mapped to a further MAC identity of the further wireless access device. Associating of the radio channel and the further radio channel to the virtual radio channel may then be based on associating the MAC identity and the further MAC identity to a virtual wireless access device. Further, the radio channel may be mapped to a PTMSI of the wireless access device, and the further radio channel may be mapped to a further PTMSI of the further wireless access device. Associating of the radio channel and the further radio channel to the virtual radio channel may then be based on associating the PTMSI and further PTMSI to the virtual wireless access device. Further, the MAC identity and the further MAC identity may be mapped to a TEID of the virtual wireless access device.

In some scenarios, the wireless access device may send at least one RRC message to the RAN node. Associating of the radio channel and the one or more further radio channels to the virtual radio channel may then be based on information indicated in the at least one RRC message. The above-mentioned RRCSetupRequest message 601 is an example of such RRC message.

At step 1240, the wireless access device forwards the data between the radio channel and the further wireless access device. This may involve forwarding downlink data received from the radio channel to the further wireless access device and/or forwarding uplink data received from the further wireless access device to the radio channel. In some scenarios, at least a part of the data is distributed redundantly to the radio channel and the one or more further radio channels, e.g., as explained in connection with FIG. 4.

In some scenarios, the wireless access device and the further wireless access device may correspond to CPE-FWA devices. Alternatively, the wireless access device and the further wireless access device are onboard a vehicle, e.g., a road vehicle, a train, a water vehicle, or an aircraft. In some cases, the wireless access device and the further wireless access device may act as redundant gateways on the same vehicle, e.g., as explained in connection with FIG. 4. In other cases, each wireless access device could be on a different vehicle, e.g., in the case of a scenario involving platooning of multiple vehicles.

Figure 13:
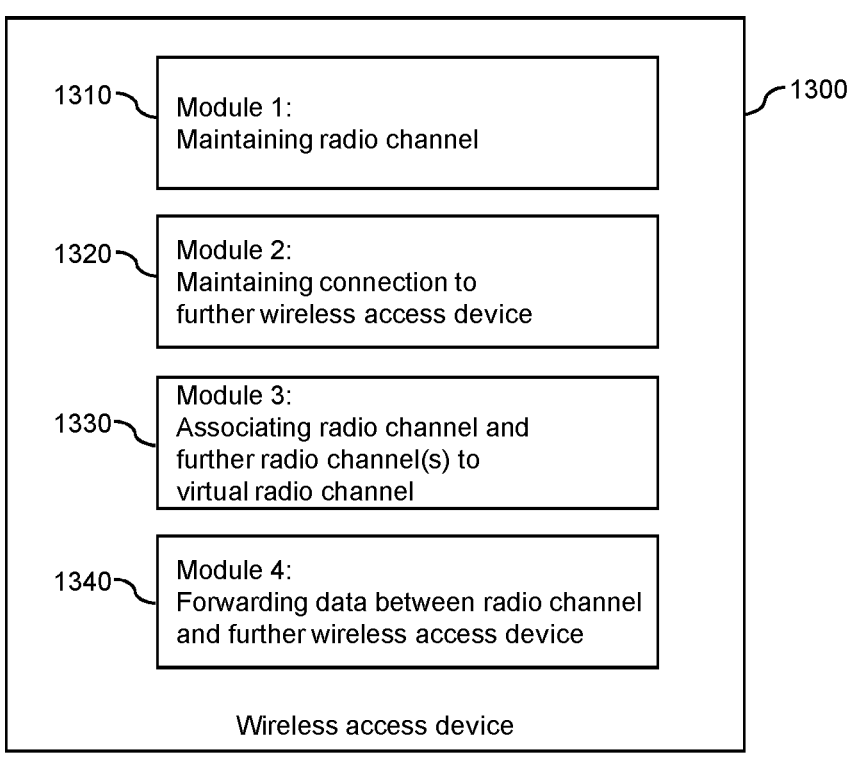
FIG. 13 shows a block diagram for schematically illustrating functionalities of a wireless access device according to an embodiment.

FIG. 13 shows a block diagram for illustrating functionalities of a wireless access device 1300 which operates according to the method of FIG. 12. The wireless access device 1300 may for example correspond to one of the above-mentioned CPE devices, in particular a CPE device having the role of a relay CPE device, such as the CPE devices 12, 13 in the scenario of FIG. 2 or the CPE devices 11, 12, and 13 in the scenario of FIG. 3. As illustrated, the wireless access device 1300 may be provided with a module 1310 configured to maintain a radio channel to a RAN node, such as explained in connection with step 1210. Further, the wireless access device 1300 may be provided with a module 1320 configured to maintain a connection to a further wireless access device, such as explained in connection with step 1220. Further, the wireless access device 1300 may be provided with a module 1330 configured to associate the radio channel and the further radio channel to a virtual radio channel, such as explained in connection with step 1230. Further, the wireless access device 1300 may be provided with a module 1340 configured to forward data between the radio channel and the further wireless access device, such as explained in connection with step 1240.

It is noted that the wireless access device 1300 may include further modules for implementing other functionalities, such as known functionalities of an FWA-CPE device or known functionalities of a UE in the LTE technology or NR technology. Further, it is noted that the modules of the wireless access device 1300 do not necessarily represent a hardware structure of the wireless access device 1300, but may also correspond to functional elements, e.g., implemented by hardware, software, or a combination thereof.

It is noted that the functionalities as described in connection with FIGS. 8 to 13 could also be combined in a system that includes a RAN node operating according to the method of FIG. 8, a wireless access device operating according to the method of FIG. 10, and at least one further wireless access device operating according to the method of FIG. 12. In such system, the wireless access device and the one or more further wireless access devices may each maintain a radio channel to the RAN node and cooperate by associating the radio channels to a virtual radio channel.

Figure 14:
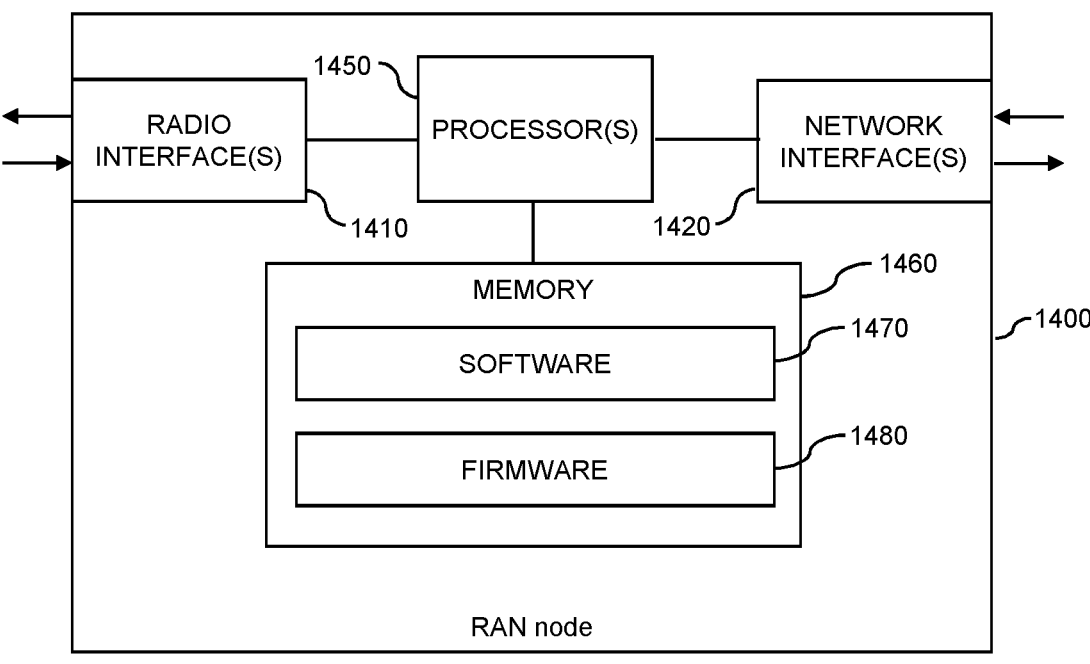
FIG. 14 schematically illustrates structures of a RAN node according to an embodiment.

FIG. 14 illustrates a processor-based implementation of a RAN node 1400 which may be used for implementing the above-described concepts. For example, the structures as illustrated in FIG. 14 may be used for implementing the concepts in the above-mentioned RAN node 100.

As illustrated, the RAN node 1400 includes one or more radio interfaces 1410. The radio interface(s) 1410 may for example be used for maintaining a wireless connection, e.g., a wireless connection between an access node and a UE. The radio interface(s) 1410 may for example be based on the LTE technology or the NR technology. The radio interface(s) 1410 may be used for maintaining the above-mentioned radio channels. Further, the RAN node 1400 may include one or more network interfaces 1420. The network interface(s) 1420 may be used for communication with other nodes of the wireless communication network, e.g., nodes of the CN 110.

Further, the RAN node 1400 may include one or more processors 1450 coupled to the interface(s) 1410, 1420 and a memory 1460 coupled to the processor(s) 1450. By way of example, the interface(s) 1410, 1420, the processor(s) 1450, and the memory 1460 could be coupled by one or more internal bus systems of the RAN node 1400. The memory 1460 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1460 may include software 1470 and/or firmware 1480. The memory 1460 may include suitably configured program code to be executed by the processor(s) 1450 so as to implement the above-described functionalities for providing wireless connectivity, e.g., as explained in connection with FIGS. 8 and 9.

It is to be understood that the structures as illustrated in FIG. 14 are merely schematic and that the RAN node 1400 may actually include further components which, for the sake of clarity, have not been illustrated, e.g., further interfaces or further processors. Also, it is to be understood that the memory 1460 may include further program code for implementing known functionalities of a RAN node, e.g., known functionalities of an eNB or of a gNB. According to some embodiments, also a computer program may be provided for implementing functionalities of the RAN node 1400, e.g., in the form of a physical medium storing the program code and/or other data to be stored in the memory 1460 or by making the program code available for download or by streaming.

Figure 15:
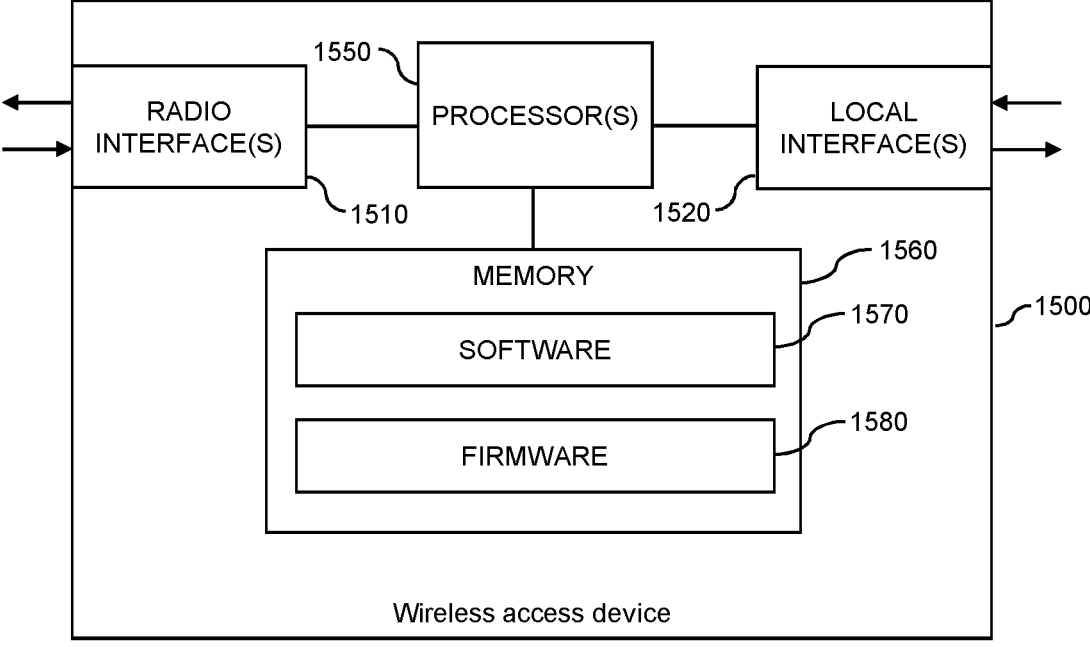
FIG. 15 schematically illustrates structures of a wireless access device according to an embodiment.

FIG. 15 illustrates a processor-based implementation of a wireless access device 1500 which may be used for implementing the above-described concepts. For example, the structures as illustrated in FIG. 15 may be used for implementing the concepts in one of the above-mentioned CPE devices 11, 12, 13.

As illustrated, the wireless access device 1500 may include one or more radio interfaces 1510. The radio interface(s) 1510 may for example be used maintaining radio channels to a RAN node, such as the above-mentioned RAN node 100. The radio interface(s) 1410 may for example be based on the LTE technology or the NR technology. Further, the wireless access device 1500 may include one or more local interfaces 1520. The local interface(s) 1520 may be used for local connection to client devices or other wireless access devices.

Further, the wireless access device 1500 may include one or more processors 1550 coupled to the interface(s) 1510, 1520, and a memory 1560 coupled to the processor(s) 1550. By way of example, the interface(s) 1510, 1520, the processor(s) 1550, and the memory 1560 could be coupled by one or more internal bus systems of the wireless access device 1500. The memory 1560 may include a ROM, e.g., a flash ROM, a RAM, e.g., a DRAM or SRAM, a mass storage, e.g., a hard disk or solid state disk, or the like. As illustrated, the memory 1560 may include software 1570 and/or firmware 1580. The memory 1560 may include suitably configured program code to be executed by the processor(s) 1550 so as to implement the above-described functionalities of a wireless access device, such as explained in connection with FIG. 10 or FIG. 12.

It is to be understood that the structures as illustrated in FIG. 15 are merely schematic and that the wireless access device 1500 may actually include further components which, for the sake of clarity, have not been illustrated, e.g., further interfaces or further processors. Also, it is to be understood that the memory 1560 may include further program code for implementing known functionalities of a FWA-CPE device or of a UE in the LTE technology or the NR technology. According to some embodiments, also a computer program may be provided for implementing functionalities of the wireless access device 1500, e.g., in the form of a physical medium storing the program code and/or other data to be stored in the memory 1560 or by making the program code available for download or by streaming.

As can be seen, the concepts as described above may be used for efficiently providing wireless connectivity using wireless access devices. In particular, multiple radio channels may be efficiently aggregated to a virtual radio channel providing improved performance and/or enhanced robustness. From the perspective of the CN, the concepts may be implemented in a transparent manner. For example, form the CN perspective, the above-mentioned vDRBs may be handled in the same way as a regular DRB. Further, the above-mentioned virtual CPE devices 10, 10' can be treated in the same way as a regular UE.

It is to be understood that the examples and embodiments as explained above are merely illustrative and susceptible to various modifications. For example, the illustrated concepts may be applied in connection with various of wireless communication technologies, without limitation to the LTE technology or NR technology, e.g., using a future 6G (6$^{th}$ Generation) technology. Further, the illustrated concepts may be applied to various types of wireless access devices. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of providing wireless connectivity, the method comprising:
a radio access network, RAN, node of a wireless communication network maintaining a radio channel having a network-side termination at the RAN node and a subscriber-side termination at a wireless access device;
the RAN node maintaining one or more further radio channels each having a network-side termination at the RAN node and a respective subscriber-side termination at a respective further wireless access device;
the RAN node associating the radio channel and the one or more further radio channels to a virtual radio channel for carrying data between the RAN node and the wireless access device, with the one or more further wireless access devices being assigned for forwarding data between the wireless access device and the respective further radio channel having its subscriber-side termination at the further wireless access device; and
the RAN node receiving at least one Radio Resource Control, RRC, message from at least one of the wireless access device and the one or more further wireless access devices,
wherein said associating of the radio channel and the one or more further radio channels to the virtual radio channel is based on information indicated in the at least one RRC message.

2. The method according to claim 1,
wherein the radio channel is mapped to a Medium Access Control, MAC, identity of the wireless access device and the one or more further radio channels are each mapped to a respective further MAC identity of the further wireless access device where the further radio channel has its subscriber-side termination, and
wherein said associating of the radio channel and the one or more further radio channels to the virtual radio channel is based on mapping the MAC identity and the one or more further MAC identities to a MAC identity of a virtual wireless access device.

3. The method according to claim 2,
wherein the radio channel is mapped to a Packet Temporary Mobile Subscriber Identity, PTMSI, of the wireless access device and the one or more further radio channels are each mapped to a respective further PTMSI of the further wireless access device where the further radio channel has its subscriber-side termination, and
wherein said associating of the radio channel and the one or more further radio channels to the virtual radio channel is based on associating the PTMSI and the one or more further PTMSIs to a virtual wireless access device.

4. The method according to claim 2,
wherein the MAC identity of the of the wireless access device and the MAC identities of the one or more further wireless access devices are mapped to a Tunnel Endpoint Identifier, TEID, assigned to the virtual wireless access device.

5. The method according to claim 1, comprising:
the RAN node performing load balancing to distribute the data to the radio channel and the one or more further radio channels.

6. The method according to claim 1, comprising:
the RAN node estimating characteristics of the radio channel and the one or more further radio channels, wherein the load balancing is based on the estimated characteristics of the radio channel and the one or more further radio channels.

7. The method according to claim 1,
wherein at least a part of the data is distributed redundantly to the radio channel and the one or more further radio channels.

8. The method according to claim 1,
wherein the wireless access device and the one or more further wireless access devices correspond to Customer Premises Edge Fixed Wireless Access, CPE-FWA, devices.

9. The method according to claim 1,
wherein the wireless access device and the one or more further wireless access devices are onboard a vehicle.

10. A method of providing wireless connectivity, the method comprising:
a wireless access device maintaining a radio channel having a subscriber-side termination at the wireless access device and a network-side termination at a radio access network, RAN, node of a wireless communication network;
the wireless access device maintaining a connection to one or more further wireless access devices, each maintaining a respective further radio channel having a subscriber-side termination at the further wireless access device and a network-side termination at the RAN node; and
the wireless access device associating the radio channel and the one or more further radio channels to a virtual radio channel for carrying data between wireless access device and the RAN node, with the one or more further wireless access devices being assigned for forwarding at least a part of the data between the wireless access device and the respective further radio channel having its subscriber-side termination at the further wireless access device,
the wireless access device sending at least one Radio Resource Control, RRC, message to the RAN node,
wherein said associating of the radio channel and the one or more further radio channels to the virtual radio channel is based on information indicated in the at least one RRC message.

11. The method according to claim 10,
wherein the radio channel is mapped to a Medium Access Control, MAC, identity of the wireless access device and the one or more further radio channels are each mapped to a respective further MAC identity of the further wireless access device where the further radio channel has its subscriber-side termination, and
wherein said associating of the radio channel and the one or more further radio channels to the virtual radio channel is based on mapping the MAC identity and the one or more further MAC identities to a MAC identity of a virtual wireless access device.

12. The method according to claim 11,
wherein the radio channel is mapped to a Packet Temporary Mobile Subscriber Identity, PTMSI, of the wireless access device and the one or more further radio channels are each mapped to a respective further PTMSI of the further wireless access device where the further radio channel has its subscriber-side termination, and
wherein said associating of the radio channel and the one or more further radio channels to the virtual radio channel is based on associating the PTMSI and the one or more further PTMSIs to a virtual wireless access device.

13. The method according to claim 11,
wherein the MAC identity of the wireless access device and the MAC identities of the one or more further wireless access devices are mapped to a Tunnel Endpoint Identifier, TEID, assigned to the virtual wireless access device.

14. The method according to claim 10,
wherein distribution of the data to the radio channel and the one or more further radio channels is based on load balancing.

15. The method according to claim 10,
wherein at least a part of the data is distributed redundantly to the radio channel and the one or more further radio channels.

16. The method according to claim 10,
wherein the wireless access device and the one or more further wireless access devices correspond to Customer Premises Edge Fixed Wireless Access, CPE-FWA, devices.

17. The method according to claim 10,
wherein the wireless access device and the one or more further wireless access devices are onboard a vehicle.

18. A method of providing wireless connectivity, the method comprising:
a wireless access device maintaining a radio channel having a subscriber-side termination at the wireless access device and a network-side termination at a radio access network, RAN, node;
the wireless access device maintaining a connection to a further wireless access device maintaining a further radio channel having a subscriber-side termination at the further wireless access device and a network-side termination at the RAN node, the wireless access device associating the radio channel and the further radio channel to a virtual radio channel for carrying data between further wireless access device and the RAN node; and
the wireless access device forwarding at least a part of the data between the radio channel and the further wireless access device,
the wireless access device sending at least one Radio Resource Control, RRC, message to the RAN node,
wherein said associating of the radio channel and the further radio channel to the virtual radio channel is based on information indicated in the at least one RRC message.

19. The method according to claim 18,
wherein the radio channel is mapped to a Medium Access Control, MAC, identity of the wireless access device and the further radio channel is mapped to a respective further MAC identity of the further wireless access device, and
wherein said associating of the radio channel and the further radio channel to the virtual radio channel is based on mapping the MAC identity and the further MAC identity to a MAC identity of a virtual wireless access device.

20. The method according to claim 19,
wherein the radio channel is mapped to a Packet Temporary Mobile Subscriber Identity, PTMSI, of the wireless access device and the further radio channel is mapped to a respective further PTMSI of the further wireless access device where the further radio channel has its subscriber-side termination, and
wherein said associating of the radio channel and the further radio channel to the virtual radio channel is based on associating the PTMSI and the further PTMSI to a virtual wireless access device.

21. The method according to claim 19, wherein the MAC identity of the wireless access device and the MAC identities of the one or more further wireless access devices are mapped to a Tunnel Endpoint Identifier, TEID, assigned to the virtual wireless access device.

* * * * *